United States Patent
Brown et al.

(10) Patent No.: US 8,995,302 B1
(45) Date of Patent: Mar. 31, 2015

(54) METHOD AND APPARATUS FOR TRANSLATED ROUTING IN AN INTERCONNECT SWITCH

(71) Applicant: PMC-Sierra US, Inc., Sunnyvale, CA (US)

(72) Inventors: David Alan Brown, Carp (CA); Peter Z. Onufryk, Flanders, NJ (US); Cesar Talledo, San Jose, CA (US)

(73) Assignee: PMC-Sierra US, Inc., Sunnyvale, CA (US)

(*) Notice: Subject to any disclaimer, the term of this patent is extended or adjusted under 35 U.S.C. 154(b) by 82 days.

(21) Appl. No.: 13/743,281

(22) Filed: Jan. 16, 2013

(51) Int. Cl.
*H04L 12/741* (2013.01)

(52) U.S. Cl.
CPC .................... *H04L 45/745* (2013.01)
USPC .......................................................... 370/254

(58) Field of Classification Search
USPC ......... 370/254, 355, 390, 216, 217, 219, 235, 370/236, 255, 352, 360, 386, 389, 392, 370/419; 709/223, 224, 207, 212, 213, 231, 709/238, 242
See application file for complete search history.

(56) References Cited

U.S. PATENT DOCUMENTS

| | | | |
|---|---|---|---|
| 5,732,092 A | 3/1998 | Shinohara | |
| 6,115,788 A | 9/2000 | Thowe | |
| 6,539,515 B1 | 3/2003 | Gong | |
| 6,934,804 B2 | 8/2005 | Hashemi | |
| 6,976,194 B2 | 12/2005 | Cypher | |
| 6,976,197 B2 | 12/2005 | Faust et al. | |
| 7,206,992 B2 | 4/2007 | Xin | |
| 7,237,183 B2 | 6/2007 | Xin | |
| 7,484,158 B2 | 1/2009 | Sharon et al. | |
| 7,860,930 B2 * | 12/2010 | Freimuth et al. | 709/205 |
| 7,937,641 B2 | 5/2011 | Amidi | |
| 7,945,721 B1 * | 5/2011 | Johnsen et al. | 710/311 |
| 7,958,430 B1 | 6/2011 | Kolokowsky et al. | |
| 7,975,193 B2 | 7/2011 | Johnson | |
| 8,140,930 B1 | 3/2012 | Mauro | |
| 8,176,367 B2 | 5/2012 | Dreifus et al. | |
| 8,219,894 B2 | 7/2012 | Au et al. | |
| 8,245,112 B2 | 8/2012 | Hicken et al. | |
| 8,245,117 B1 | 8/2012 | Wu | |
| 8,255,770 B2 | 8/2012 | Park et al. | |
| 8,261,136 B2 | 9/2012 | D'abreu et al. | |
| 8,281,217 B2 | 10/2012 | Kim et al. | |
| 8,281,227 B2 | 10/2012 | Thatcher et al. | |

(Continued)

OTHER PUBLICATIONS

RFC 793: Transmission Control Protocol, RFC 793, University of Southern California, IETF, Sep. 1981.*

(Continued)

*Primary Examiner* — Benjamin H Elliott, IV
*Assistant Examiner* — Eric Nowlin
(74) *Attorney, Agent, or Firm* — Kenneth Glass; Molly Sauter; Glass & Associates

(57) ABSTRACT

A system and method are disclosed for a flexible routing engine in a PCIe switch. The system may include a switch manager that is enabled, through firmware, to configure one or more routing tables associated with a switch stack of a PCIe switch. To enable non-transparent bridging and non-standard routing, the method may include receiving a transaction layer packet at a translated routing port of a PCIe switch, and performing translation of the address and requester ID of the packet utilizing tables that are updated by the firmware of the switch manager to route the packet through the switch.

17 Claims, 18 Drawing Sheets

(56) References Cited

U.S. PATENT DOCUMENTS

| | | |
|---|---|---|
| 8,286,004 B2 | 10/2012 | Williams |
| 8,307,258 B2 | 11/2012 | Flynn et al. |
| 8,327,220 B2 | 12/2012 | Borchers et al. |
| 8,335,977 B2 | 12/2012 | Weingarten et al. |
| 8,359,522 B2 | 1/2013 | Gunnam et al. |
| 8,392,789 B2 | 3/2013 | Biscondi et al. |
| 8,402,201 B2 | 3/2013 | Flynn et al. |
| 8,418,023 B2 | 4/2013 | Gunnam et al. |
| 8,429,497 B2 | 4/2013 | Tu et al. |
| 8,473,812 B2 | 6/2013 | Ramamoorthy et al. |
| 8,504,887 B1 | 8/2013 | Varnica et al. |
| 8,555,140 B2 | 10/2013 | Gunnam et al. |
| 8,621,318 B1 | 12/2013 | Micheloni et al. |
| 8,656,257 B1 | 2/2014 | Micheloni et al. |
| 8,694,849 B1 | 4/2014 | Micheloni et al. |
| 8,694,855 B1 | 4/2014 | Micheloni et al. |
| 8,707,122 B1 | 4/2014 | Micheloni et al. |
| 8,769,374 B2 | 7/2014 | Franceschini et al. |
| 8,787,428 B2 | 7/2014 | Dai et al. |
| 8,856,622 B2 | 10/2014 | Ramamoorthy et al. |
| 2003/0033567 A1 | 2/2003 | Tamura et al. |
| 2003/0104788 A1 | 6/2003 | Kim |
| 2004/0088636 A1 | 5/2004 | Cypher |
| 2004/0123230 A1 | 6/2004 | Lee et al. |
| 2004/0252791 A1 | 12/2004 | Shen et al. |
| 2005/0248999 A1 | 11/2005 | Tamura et al. |
| 2006/0050694 A1* | 3/2006 | Bury et al. .................... 370/389 |
| 2006/0206655 A1* | 9/2006 | Chappell et al. .............. 710/315 |
| 2007/0050688 A1 | 3/2007 | Thayer |
| 2007/0089031 A1 | 4/2007 | Huffman et al. |
| 2007/0118743 A1* | 5/2007 | Thornton et al. ............. 713/164 |
| 2008/0005382 A1 | 1/2008 | Mimatsu |
| 2008/0016425 A1 | 1/2008 | Khan et al. |
| 2008/0229079 A1 | 9/2008 | Flynn et al. |
| 2008/0229164 A1 | 9/2008 | Tamura et al. |
| 2008/0256292 A1 | 10/2008 | Flynn et al. |
| 2009/0327802 A1 | 12/2009 | Fukutomi |
| 2010/0199149 A1 | 8/2010 | Weingarten |
| 2010/0211737 A1 | 8/2010 | Flynn et al. |
| 2010/0211852 A1 | 8/2010 | Lee et al. |
| 2010/0246664 A1 | 9/2010 | Citta et al. |
| 2010/0293440 A1 | 11/2010 | Thatcher |
| 2011/0072331 A1 | 3/2011 | Sakaue et al. |
| 2011/0246853 A1 | 10/2011 | Kim |
| 2011/0296084 A1 | 12/2011 | Nango |
| 2012/0051144 A1 | 3/2012 | Weingarten et al. |
| 2012/0054413 A1 | 3/2012 | Brandt |
| 2012/0311402 A1 | 12/2012 | Tseng et al. |
| 2013/0145235 A1 | 6/2013 | Aussien et al. |
| 2013/0163328 A1 | 6/2013 | Karakulak et al. |
| 2014/0053037 A1 | 2/2014 | Wang et al. |
| 2014/0072056 A1 | 3/2014 | Fay |
| 2014/0281823 A1 | 9/2014 | Micheloni et al. |

OTHER PUBLICATIONS

RapidIO, PCI Express, and Gigabit Ethernet Comparison: Pros and Cons of Using These Interconnects in Embedded Systems; RapidIO Trade Association, Technical White Paper, Revision 03, May 2005.*

PCI Express Base Specification Revision 3.0 (PCI Express Base Specification, PCISIG, Nov. 10, 2010; hereinafter "PCIExpress").*

* cited by examiner

| Field | Register | Requirement | Implementation |
|---|---|---|---|
| SERR# Enable | Control Register | PCIe Base Specification | F/W: Modify Implicit Search Table |
| ISA Enable | | PCIe Base Specification | HW: Full Implementation |
| VGA Enable | | PCIe Base Specification | HW: Full Implementation |
| SERR# Enable | Command Register | PCIe Base Specification | F/W: Modify Implicit Search Table |
| I/O Space Enable | | Primary side of P2Ps UR/enable for I/O requests. | F/W: Modify IO Address Search Table |
| Memory Space Enable (MSE) | | Primary side of P2Ps UR/enable for I/O requests. Address routed messages always route. | F/W: Modify Memory Address Search Table and Modify Multicast Vector Enable |
| Bus Master Enable (BME) | | Secondary side of P2Ps UR/enable requests. Address routed messages always route. | F/W: Modify Memory Address Search Table and Modify Multicast Vector Enable |

FIG. 5A

| Field | Register | Requirement | Implementation |
|---|---|---|---|
| SERR# Enable | Command Register | PCIe Base Specification | F/W: Modify Implicit Search Table |
| I/O Space Enable | | Primary side of P2Ps UR/enable for I/O requests. | F/W: Modify IO Address Search Table |
| Memory Space Enable (MSE) | | Primary side of P2Ps UR/enable for I/O requests. Address routed messages always route. | F/W: Modify Memory Address Search Table and Modify Multicast Vector Enable |
| Bus Master Enable (BME) | | Secondary side of P2Ps UR/enable requests. Address routed messages always route. | F/W: Modify Memory Address Search Table and Modify Multicast Vector Enable |

FIG. 5B

METHOD AND APPARATUS FOR TRANSLATED ROUTING IN AN INTERCONNECT SWITCH

BACKGROUND OF THE INVENTION

Peripheral Component Interconnect Express (PCIe) is a third generation Input Output (3GIO) system that implements a serial, switched-packet, point-to-point communication standard at the system level. PCI Express has achieved many advantages over the prior shared bus system, such as quality of service (QoS), high speed peer-to-peer communication between external devices, adaptability, and low pin counts. The basic PCI Express architecture includes a root complex, optionally, a PCI Express switch, and PCI Express endpoints.

In the prior art implementation of a PCI Express switch for routing incoming data packets between root complex and endpoint devices, the transaction layer packet (TLP) routing functions of the switch are hard-coded into the switch. Hard-coding of the switch routing functions is performed during the initial silicon fabrication. If errors are made in the hard-coding of the routing functions during the fabrication process, new revisions of silicon are required to correct the errors. Additionally, if new routing function features are to be added to the device, it would be necessary to fabricate a new revision of the silicon to incorporate the new features. Fabricating new revisions of silicon is an expensive and time-consuming process which undesirably delays the device time-to-market. As the PCIe standard matures it may also be necessary to implement non-standard routing features that may not be included in the standard PCIe devices.

Thus, there is a need for a method and apparatus that will reduce the cost of implementing changes to the TLP routing function of the PCI Express device after initial fabrication of the silicon and that will also reduce the time delay required to implement the changes to the routing function. Additionally, there is a need in the art for implementing non-standard features of PCIe devices into a PCIe switch.

SUMMARY OF THE INVENTION

The present invention provides a system and method for a flexible routing engine in a switch for coupling a CPU to a plurality of I/O devices through a root complex. In a particular embodiment, the switch may be a PCIe switch operating in a PCIe switch fabric topology. In an additional embodiment, the switch may be a RapidIO switch operating in a RapidIO switch fabric topology.

A method for flexible routing in a switch may include receiving a configuration request transaction layer packet at a switch stack of the switch. In accordance with the present invention, a switch stack is port logic that implements the physical layer, data link layer, and transaction/application layer functions of the PCIe protocol. The configuration request transaction layer packet may be generated by a root complex coupled to the switch. The switch stack may then forward the configuration request transaction layer packet received to a switch manager of the switch. The switch manager may then interpret the configuration request transaction layer packet at the switch manager and update at least one table of the switch stack based upon the interpretation of the configuration request transaction layer packet by the switch manager. After updating the tables of the switch stack, the switch manager may then synthesize a configuration completion transaction layer packet and forward the configuration completion transaction layer packet to the root complex.

In a particular embodiment, the switch stack may implement a configuration space Type 0 header format and in an additional embodiment, the switch stack may implement a configuration space Type 1 header format.

In interpreting the configuration request transaction layer packet at the switch manager, the switch manager may run firmware to identify at least one desired behavior of the switch stack. After identifying the desired behavior, the switch manager may update a routing table, an ingress transaction layer packet editing table or an egress transaction layer packet editing table of the switch stack by writing the desired behavior into the tables.

In the present invention, a system for flexible routing in a switch may include a switch comprising two or more switch stacks, wherein the switch stacks may receive a configuration request transaction layer packet generated by a root complex coupled to the switch. The switch may further include a switch manager coupled to the switch stacks. The switch manager may receive a configuration request transaction layer packet forwarded from the switch stacks. The switch manager may interpret the configuration request transaction layer packet update at least one table of the switch stacks based upon the interpretation of the configuration request transaction layer packet by the switch manager. Upon updating the switch stack, the switch manager may further generate a configuration completion transaction layer packet and may forward the configuration completion transaction layer packet to the root complex.

To update the tables of the switch stack, the switch manager may run firmware to identify at least one desired behavior of the switch stack and may then update a routing table, an ingress transaction layer packet editing table or an egress transaction layer packet editing table based upon the identified desired behavior of the switch stack.

In a specific embodiment, non-transparent routing of the transaction layer packet request is provided utilizing a translated routing port. The translated routing port is responsible for translating the address and requester ID of the request. Translation of the address and the requester ID provides for non-transparent bridging within the switch, thus enabling the switch to provide connectivity between multiple root complexes and the various ports of the switch. Translation of the request address and the REQID are implemented utilizing tables that the switch manager is responsible for updating.

These and other advantages of the present invention will become obvious to those of ordinary skill in the art after having read the following detailed description of the preferred embodiments, which are illustrated in the various drawing figures.

BRIEF DESCRIPTION OF THE DRAWINGS

FIG. 5A is a table illustrating an implementation of the present invention for a type 1 configuration header.

FIG. 5B is a table illustrating an implementation of the present invention for a type 0 configuration header.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The present invention is applicable to a general or special purpose computing system wherein multiple root complexes are coupled to a central processing unit and are sharing a group of input/output devices through a common switch fabric. More specifically, the exemplary embodiments described herein are related to a routing mechanism for routing data when the switch fabric utilizes a PCI Express (PCIe) protocol.

Figure 1:
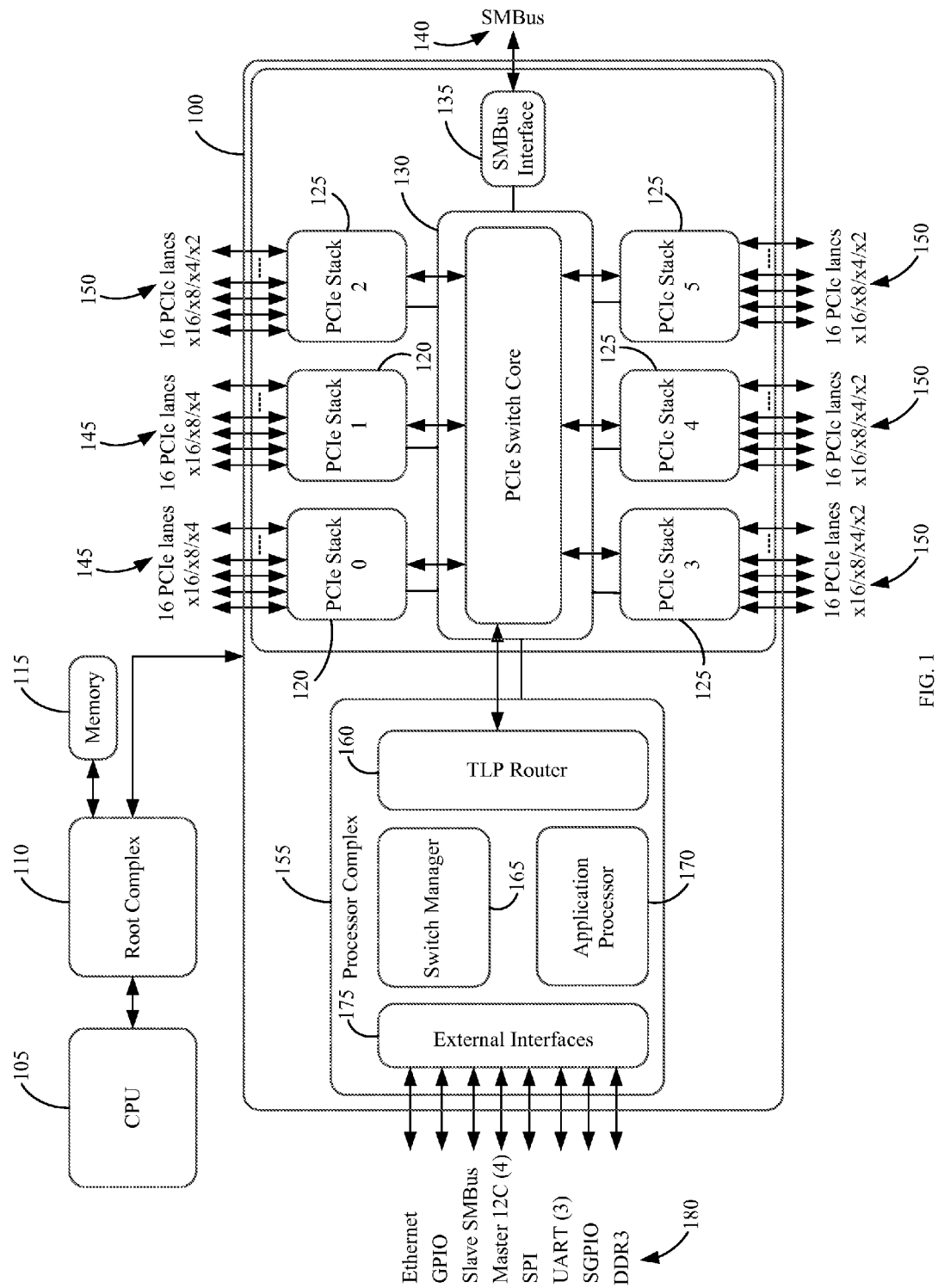
FIG. 1 is a block diagram illustrating a switch having a flexible routing engine in accordance with an embodiment of the present invention.

With reference to FIG. 1, a PCIe switch fabric topology is illustrated in which a root complex 110 of the PCIe system may communicate with multiple endpoints (i.e. I/O devices) of the system through a switch 100. The switch 100 may include a plurality of PCIe stacks 120, 125 coupled to a PCIe switch core 130 through which the root complex 110 may communicate with the endpoints. The endpoints may in turn communicate with the root complex 110 through the PCIe stacks 120, 125 of the switch 100 and additionally, the endpoints may communicate with other endpoints of the PCIe system through the PCIe stacks 120, 125.

In the illustrated embodiment, the PCIe stacks 120 may communicate with the various endpoints via a x16/x8/x4 symmetrical link 145 and the PCIe stacks 125 may communicate with the various endpoints via a x16/x8/x4/x2 symmetrical link 150. As is known in the art PCIe links include a pair of transmit and receive port links, commonly referred to as a lane. In accordance with the PCI Express Specification various combinations of operational lane widths are permitted to support a desired bandwidth.

The root complex 110 is the root of an I/O hierarchy that connects a central processing unit (CPU) 105 and a memory subsystem 115 to the I/O. The root complex 110 of the switch fabric may generate transaction requests to various endpoints initiated by the CPU 105. The memory subsystem 115 may additionally be coupled to the root complex 110 to facilitate the storage and retrieval of data required for the operation of the root complex 110 and the switch 100.

The switch core 130 may additionally be coupled to system management bus 140 through a system management bus interface 135. As is known in the art, a system management bus (SMBus) is a two-wire interface through which various system component chips can communicate with each other and with the rest of the switch fabric. The SMBus often provides a means for debug related communications.

PCIe transactions at the transaction layer may be identified as memory transactions, I/O transactions, configuration transactions or message transactions. Transactions at the transaction layer may include one or more transaction layer packet transmissions required to transfer information between a requester and a completer. In general any device can be a requestor or completer.

In a system utilizing a PCIe switch 100, before such transaction layer packets can be generated by a requester of the system to be accepted by a completer, the requester and the completer must be configured to insure compliance with the system transaction layer packet routing scheme. To configure the requester and completer devices, upon start-up of a PCIe switch 100, the software executing on the CPU 105 coupled to the PCIe switch may request that the root complex 110 initiate configuration transactions to read from or write to a configuration register of one or more of the PCIe stacks 120, 125 coupled to the switch core 130. In the prior art, combinational logic that is controlled by configuration registers are implemented in hardware and the hardware registers are accessed by the root complex 110 to discover the presence of a particular function as well as to write to the hardware register to configure the function for standard operation. In the prior art, the root complex 110 transmits configuration transaction layer packets to the switch 100 to configure the functionality of a PCIe stack 120, 125. The configuration transaction layer packet may include a payload for programming a desired behavior into a register of the PCIe stack 120, 125. Upon receipt of the configuration transaction layer packet at the PCIe stack 120, 125, the payload of the packet may be used to directly write the desired behavior into a hardware register of the PCIe stack 120, 125. As such, in accordance with the prior art the hardware registers of the PCIe stacks 120, 125 include the standard registers that may be written to by the root complex 110 to modify their behavior.

In accordance with the present invention, the switch 100 may further include a switch manager 165 running firmware that is responsible for modifying the behavior of the PCIe stacks 120, 125 through the switch core 130.

As shown in FIG. 1, the switch 100 of the present invention may include a processor complex 155 comprising a switch manager 155 and a TLP (transaction layer packet) router 160. In operation, the configuration transaction layer packets from the root complex 110 may be intercepted and rerouted to the switch manager 155 through the switch core 130 and the TLP router 160. Upon receipt of the configuration transaction layer packet, the switch manager 165 may then run firmware to identify a desired behavior for one of the PCIe stacks 120, 125. Upon identification of the desired behavior, the switch manager may write to one or more tables in the PCIe stack 120, 125 to configure the PCIe stack for the desired behavior. In accordance with the present invention, the firmware associated with the switch manager may be updated at any time to correct fabrication errors in the switch 100 or to implement new features into the switch 100.

The processor complex may further include an application processor 170 which may enable additional functionality such as baseboard management control (BMC) and enclosure management capabilities. In operation, the configuration transaction layer packets from the root complex 110 may be intercepted and rerouted to the application processor 170 through the switch core 130 and the TLP router 160. Additionally, the processor complex may include an external interface 175 which may couple to various external protocols 180, including, but not limited to, Ethernet and DDR3.

Figure 2:
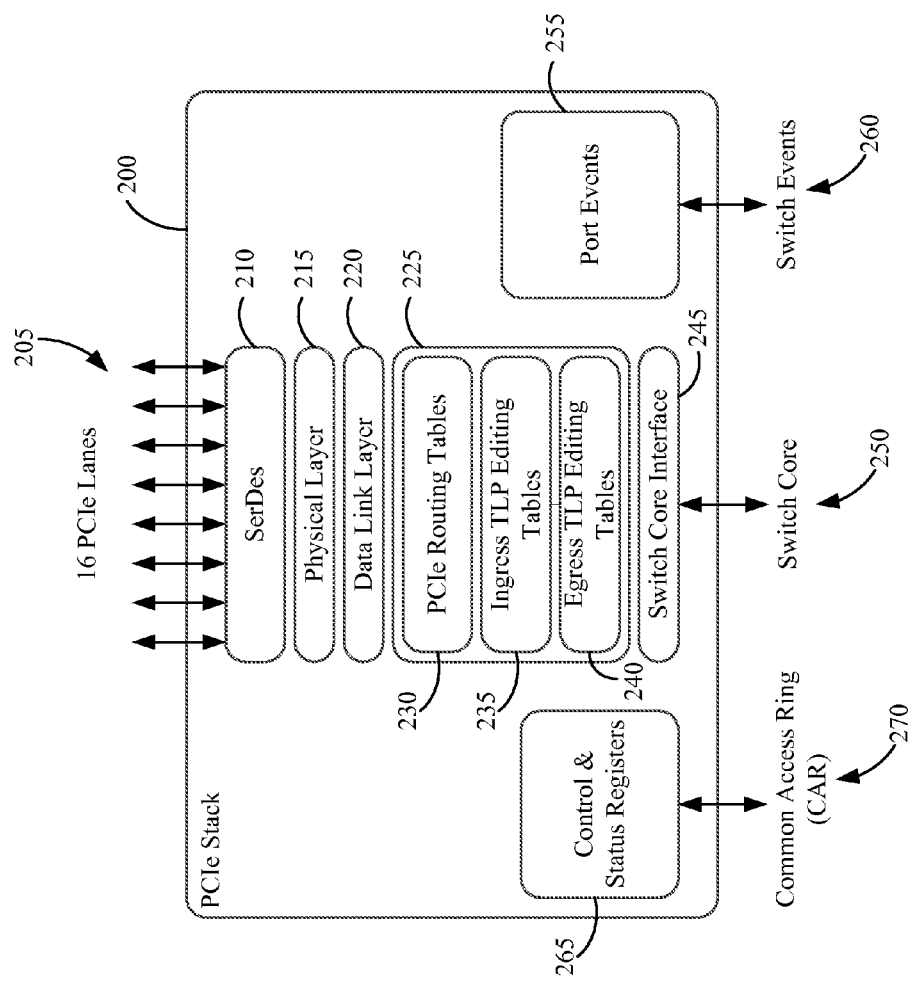
FIG. 2 is a block diagram illustrating a switch stack of a switch having a flexible routing engine in accordance with an embodiment of the present invention.

With reference to FIG. 2, a PCIe stack 200 in accordance with an embodiment of the present invention is illustrated in more detail. As shown in FIG. 2, the PCIe stack 200 may include various interfaces and communication layers. In this embodiment, the PCIe stack 200 may include a serializer/deserializer (SerDes) interface 210 coupled to an endpoint through the PCIe lanes 205. In an additional embodiment the SerDes interface 210 may be coupled to a root complex or another switch. The SerDes 210 may communicate with a physical layer 215 of the PCIe architecture which may in-turn communicate with a data link layer 220 of the architecture. At the transaction layer 225, the routing of transaction layer packets through the PCIe stack may be controlled by PCIe routing tables 230, ingress TLP editing tables 235 and egress TLP editing tables 240. The PCIe stack may be configured by writing a desired behavior to the PCIe routing tables 230, ingress TLP editing tables 235 and egress TLP editing tables 240. In the present invention, the switch manager 165 runs firmware to identify a desired behavior for the PCIe stack and writes the desired behavior into the PCIe routing tables 230, ingress TLP editing tables 235 and egress TLP editing tables 240 to configure the switch. The PCIe stack 200 may communicate with the switch core 250 through the switch core interface 245. The PCIe stack 200 may further include a port events unit 255 to intercept switch events 260 for the PCIe stack 200 and a control and status register 265 to communicate with a common access ring (CAR) associated with the switch core 250.

In one embodiment of the present invention, there is one routing table 230 for each PCIe stack 200 and multiple ports in the same stack may share the same routing table 230. Additional embodiments are within the scope of the present invention, wherein the multiple routing tables 230 may be implemented and multiple PCIe stacks 200 may share common routing tables 230.

In accordance with the PCIe specification, configuration transaction layer packets (CFG TLPs) target the configuration space of the PCIe device to provide configuration and setup information for the device during enumeration. The PCIe specification defines two formats for the PCIe configuration headers used to configure a PCIe device. The two formats are referred to as type 0 and type 1 headers. Type 0 PCIe configuration headers do not contain a bus number and are interpreted by all devices as being for PCIe configuration addresses on the main PCIe bus. Alternatively, in order to address devices that are not on the main PCIe bus, type 1 PCIe configuration headers that contain a bus number can be used as a mechanism to allow PCIe-PCIe bridges to decide whether or not to pass configuration transaction layer packets from the main PCIe bus to a secondary PCIe bus to allow configuration of PCIe devices on the secondary PCIe bus. In the prior art, these headers were implemented in hardware registers that directly controlled the forwarding of the PCIe configuration transaction layer packets.

The PCIe stacks 200 of the present invention utilize both type 0 and type 1 headers, which are implemented in memory attached to the CPU running the switch firmware, instead of being hardware encoded into the switch 100. As such, upon receiving a type 0 configuration request transaction layer packet from the root complex 110 at a switch stack 200 of the switch 100, instead of updating the routing tables of the switch 225, the switch stack 200 may forward the type 0 configuration request transaction layer packet to the switch manager 165. The switch manager 165 may then interpret the type 0 configuration request transaction layer packet and update the routing tables 225 of the switch stack 200 to configure a PCIe device residing on the main PCIe bus. Additionally, upon receiving a type 1 configuration request transaction layer packet from the root complex 110 at a switch stack 200 of the switch, instead of updating the routing tables of the switch 225, the switch stack 200 may forward the type 1 configuration request transaction layer packet to the switch manager 165. The switch manager 165 may then interpret the type 1 configuration request transaction layer packet and update the routing tables 225 of the switch stack 200 to configure a PCIe device residing on a bus that is downstream of the main PCIe bus.

Figure 3:
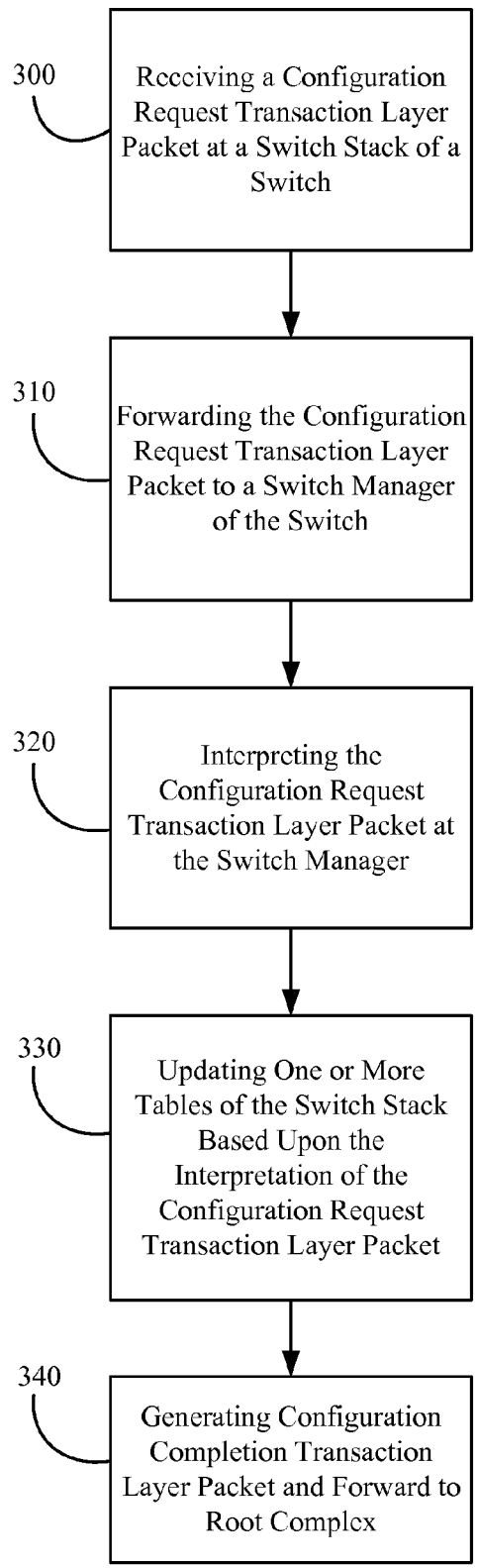
FIG. 3 is a flow diagram illustrating a method of flexible routing in a switch in accordance with an embodiment of the present invention.

With reference to FIG. 3, in general operation the present invention may receive a configuration request transaction layer packet at a switch stack of a switch 300. The configuration request transaction layer packet may then be forwarded to a switch manager of the switch 310. The switch manager may then interpret the configuration request transaction layer packet using firmware 320 and update one or more tables of the switch stack based upon the interpretation of the configuration request transaction layer packet 330. Upon completion of the table update, the switch manager may generate a configuration completion transaction layer packet and forward the packet to the root complex 340.

In a specific embodiment, the switch 100 may include six switch stacks 200, wherein each switch stack 200 may include various capabilities and the capabilities may vary among the six switch stacks 200. In a particular embodiment, each of the switch stacks 200 may comprise up to sixteen PCIe lanes 205 and the PCIe lanes 205 may further be identified as belonging to a port of the switch 100. The ports of the switch may be numbered and a routing table entry may be made for each of the ports of the switch. The port numbering may include an internal port for the switch manager 165 and an internal port for the application processor 170. In a particular embodiment, there may be at most eight ports in a stack, or sixteen ports on the virtual buses. In general, ports of the same stack that are in the same partition will have the same entries in the routing tables. In the present invention, routing tables are a stack resource and the routing tables are shared amongst the ports in a given stack. In addition to the routing established by the routing tables, there are also port based considerations to routing, including Access Control Services (ACS), multicast blocking, Bus Master Enable (BME), etc.

In accordance with the present invention, routing tables 230, ingress TLP editing tables 235 and egress TLP editing tables 240 are a stack resource and the tables are shared among the ports in a given switch stack 200. In the present invention non-multicast TLPs may be routed by ID, memory address, I/O address or implicitly and multicast TLPs may be routed utilizing a multicast vector. As such, the present invention may include an ID search table memory address search table, an IO search address search table, an implicit search table and multicast tables. When the multicast tables are used, a multicast vector with each port as a bit is also used.

Figure 4:
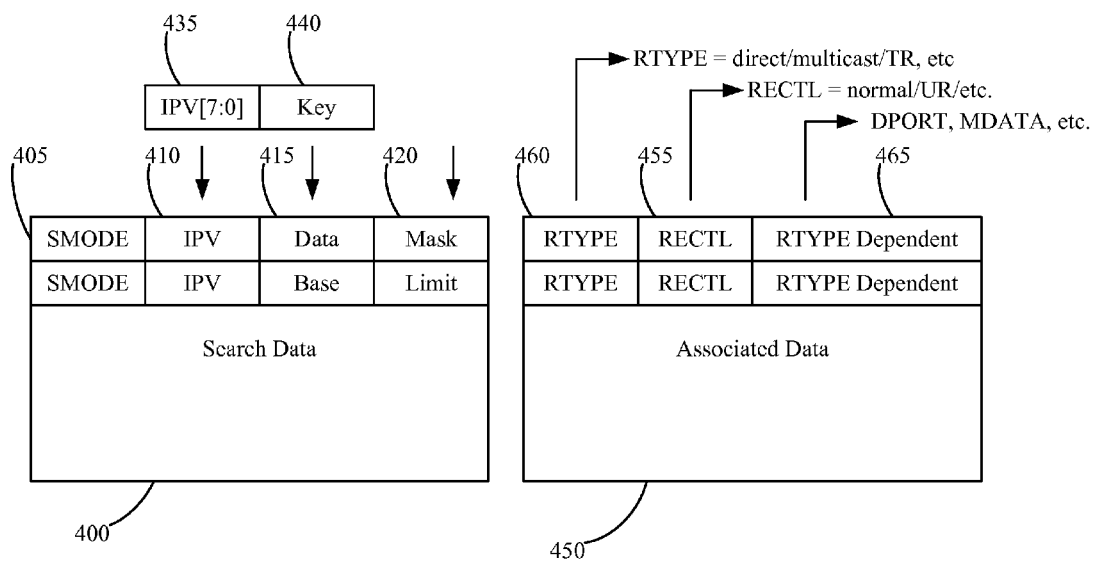
FIG. 4 is a diagram illustrating a generic search in accordance with an embodiment of the present invention.

In general, the routing tables of the present invention are searched as shown with reference to FIG. 4. As shown in FIG. 4, the search data 400 comprises the search mode (SMODE) 405, which is the search criteria (i.e. inside range) and the transaction layer packet (TLP) type that will match (i.e. posted). In the present invention, both criteria and TLP type must match. The search may also include the ingress port vector (IPV) 435 (i.e. within a stack) that the TLP was received on. The key 440, base address 425 limit address 430, data 415, mask 420 or other fields of the received TLP may further be included in the search data. The base address 425 and limit address 430 are the base and limit of the port in the case of a type 1 header, or in the case of a type 0 header, the base address 425 and the limit address 430 are header's base address register (BAR) expressed as a base and a limit. The common associated data 450 and routing exception control (RECTL) 455 are returned from the search to route the TLP. The routing type (RTYPE) 460 returned may be direct, multicast, translated, etc. The routing exception control (RECTL) 455 may include any exceptions to the normal routing. The routing exception control, (RECTL) is returned by the various search tables, as part of the associated data, to determine whether to route the TLP to the DPORT normally, or take some other action. The RECTL field is on a per IPV bit basis. For each IPV bit that is set there is a corresponding RECTL field associated with that bit. The routing type (RTYPE) dependent 465 may include the destination port or where to forward the TLP. A match in a search table occurs when all of the following are true, (1) the ingress port vector (IPV) bit is set for the port that the TLP was received on, (2) the received TLP type matches the TLP type and (3) the search criteria is met.

In establishing the values within the routing tables to be searched, specific bits in the configuration headers are modified to affect the routing of the TLPs. In a specific embodiment, the bits affecting the routing of a type 1 header in accordance with the present invention are shown with reference to the table of FIG. 5A. In an additional embodiment, the bits affecting the routing of a type 0 header in accordance with the present invention are shown with reference to the table of FIG. 5B. As shown in the tables of FIG. 5A and FIG. 5B, in the present invention, firmware in the switch manager 165 modifies specific tables (i.e. implicit search table, memory address table, 10 search table, etc.) associated with specific bits of the type 1 and type 0 headers in order to implement the desired routing of the TLPs through the switch fabric. In a specific example, the present invention utilizes firmware and the switch manager 165 to modify the memory address search table to implement routing control for the memory space enable (MSE) and bus master enable (BME) bits of the header. As such, in the present invention, firmware is responsible for the MSE and BME bits in the type 1 and type 0 headers.

In accordance with the present invention, standard PCIe registers are exposed to the root complex via the configuration transaction layer packets (CFG TLPs). All CFG TLPs that target a function in the switch are forward to the switch manager and managed by firmware in combination with the switch hardware. In the present invention, the implementation cost of the tables is minimized to provide a simple behavior for the switch hardware to implement.

The previous embodiments described the transparent switch ports of the switch in which PCIe hierarchy isolation is provided between PCIe busses. In the previous embodiments, one root complex enumerates the system through discovery of the switches and the end points. For the transparent switch ports, the configuration status registers with a type 1 header inform the root complex that additional PCIe functions lie downstream of the switch and that the processor should continue to enumerate beyond the switch. Additionally, the configuration status registers with a type 0 header inform the root complex that no additional PCIe functions are downstream of the switch. Following enumeration and discovery, the PCIe system is aware of which PCIe functions are present along with their memory and I/O space requirements.

Often it is desirable to utilize a multihost system employing multiple processors and root complexes. Multihost systems provide increased processing bandwidth and also allow greater system reliability. However, if a second root complex is added to the system, both root complexes will attempt to enumerate and memory map the entire system independently of one another, resulting system operation failure as both processors attempt to service the same system requests.

In order to accommodate multiple root complexes, switch ports that may be configured to be non-transparent may be integrated into a PCIe switch. Non-transparent ports add logical isolation of the root complexes by providing processor domain partitioning and address translation between the memory-mapped spaces of these domains. In the present invention, ports providing translation of addresses to accommodate non-transparent routing are referred to as translated ports. These translated ports provide a path between buses of the root complexes for data to be transferred between the domains. The translated ports expose a type 0 header on both sides of the port and appear as an endpoint to discovery software, although additional devices are actually present on the other side of the port. Processors or root complexes on the respective side of the switch only enumerate until a type 0 header is found.

One method for providing redundant paths between two different route complexes and a single endpoint involves a proprietary switch port behavior referred to as mapped I/O. In mapped I/O (MIO), downstream ports forward memory request transaction layer packets by requester ID (REQID), instead of by address. The REQID comprises the PCIe device's bus number, device number and function number (BDF). The BDF is used to identify each installed PCIe device. Mapped I/O allows different functions in a multi function PCIe device to communicate with different root complexes. Such a configuration is useful in storage systems utilizing flash controllers in which redundancy desired.

In the prior art, the configuration space for the PCIe device contains registers that control which part of the mapped I/O space the device uses. In accordance with the present invention, the mapped I/O routing function is implemented in customized routing tables that firmware and the switch manager are responsible for updating. Implementing the mapped I/O routing function in updatable routing tables allows fabrication errors to be corrected and additional features to be added to the PCIe system. Additionally, implementing the mapped I/O routing function in updatable routing tables eliminates the need for custom software drivers and allows a standard software driver to be used to communicate with devices on a downstream port of the switch.

Figures 6A, 6B:
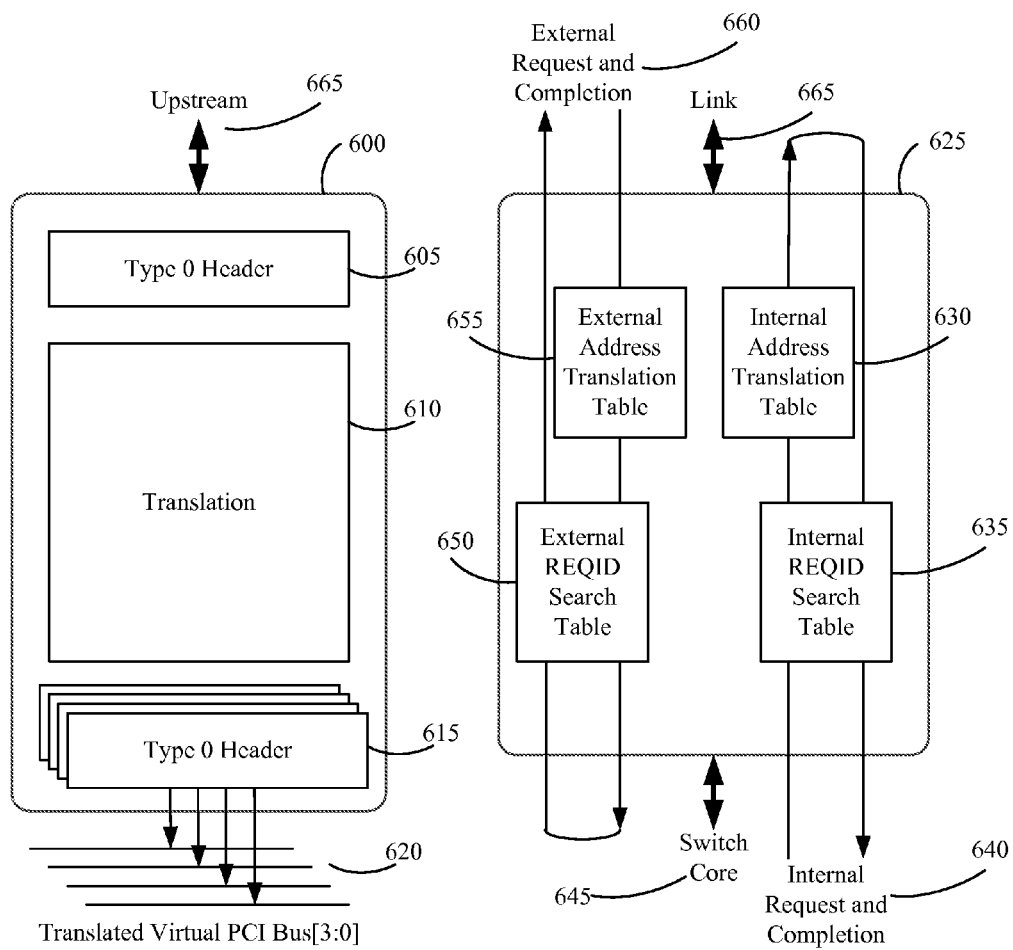
FIG. 6A is a diagram illustrating a logical view of a translated routing port.
FIG. 6B is a diagram illustrating a physical view of a translated routing port.

With reference to FIGS. 6A and 6B, in an exemplary system employing translated routing in accordance with an embodiment of the present invention, a port of a PCIe switch employing translated routing is illustrated. FIG. 6A illustrates the logical view of the translated routing port 600 in which translation 610 is performed between the type 0 header 605 at the upstream 665 side of the translated routing port 600 and a plurality of type 0 headers 615, each coupled to a plurality of translated virtual PCI buses 620. As such, address and requester ID translation may be accomplished between the transparent virtual bus and the translated virtual bus of the port 600. FIG. 6B illustrates the physical view of the translated routing port 625 for translating addresses and requester IDs (REQID) forwarded between the link 665 and the switch core 645. In this embodiment, internal requests and completions 640 originating and terminating at the switch core 645 may have their address and REQID translated utilizing an internal address translation table 630 and an internal REQID search table 635. In addition, external requests and completions 660 originating and terminating at the link 665 may have their address and REQID translated utilizing an external address translation table 655 and an external REQID search table 650.

In the present invention translated routing of a port may only be available on certain ports of the switch and is enabled via a stack configuration bit. Enabling translated routing at a port incurs a latency increase and only translation layer packet requests that utilizing memory address routing may be translated. Translated requests will have their address translated and their requester ID (REQID) translated. In addition, completions related to the requests will have their REQID translated back prior to forwarding of the completion. As such, employing translated routing at the switch supports non-transparent bridging and other non-standard routing paradigms.

Figure 7:
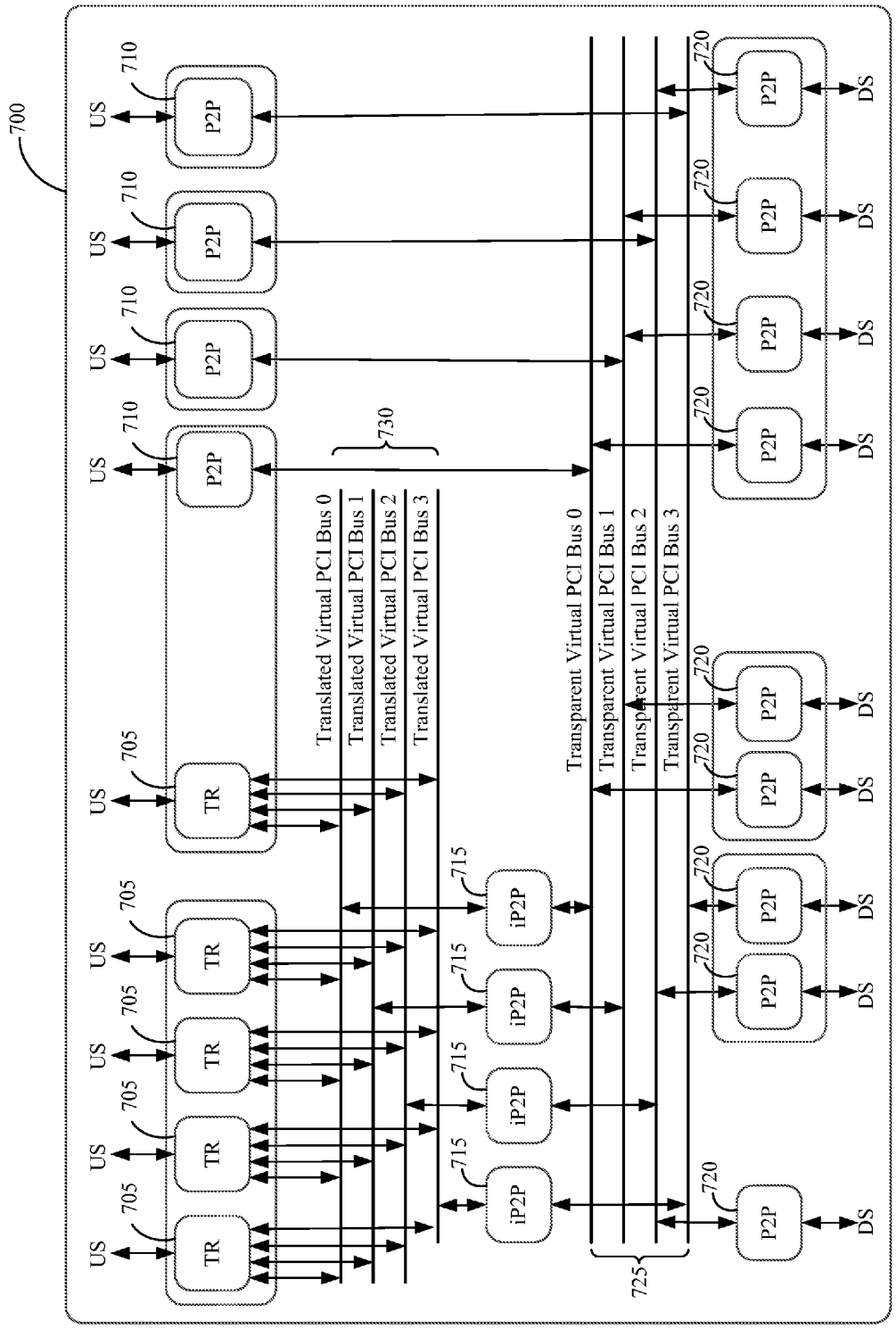
FIG. 7 is a diagram illustrating a detailed logical view of a translated routing port.

FIG. 7 illustrates the logical view of the switch 700 in additional detail. In a particular embodiment, the switch may comprise between one and four transparent virtual buses 725 or partitions. The switch may comprise between zero and one peer-to-peer (P2P) 710 ports configured as upstream (US) ports connected to each of the transparent virtual buses 725. Additionally, there may be between zero and "N" P2P ports 720 configured as downstream (DS) ports on each of the transparent virtual buses 725. In the present invention, each of the translated routing ports (TR) 705 may be designated as downstream port or an upstream port. In a particular embodiment, translated routing ports may only exist on two specific stacks of the switch 700 and translated routing ports 705 and P2P ports 710 may coexist in various configurations on these specific stacks, with a maximum of four translated routing ports 705 per stack.

In accordance with the present invention, routing is only allowed between ports that connect through one of the virtual buses. Translated routing ports 705 can connect to between one and four translated virtual buses 730 and P2P ports 710, 720 can attach to one transparent virtual bus 725. An internal P2P (iP2P) port 715 is instantiated by firmware of the present invention for each transparent virtual bus 725 that a translated routing port 705 connects to and iP2P ports 715 connect the transparent virtual bus 725 to the translated virtual bus 730. In the logical operation of the switch 700, each P2P 710, 720 and/or each iP2P 715 acts as a "PCI to PCI" bridge, as defined by the PCI bridge specification. Each translated routing port 705 implements a type 0 header, facing in both directions. The switch manager configures the type 0/1 headers and the transaction layer packets flow as desired from the translated virtual PCI bus 730 to the transparent virtual PCI bus 725 through the iP2P 715 or directly from a P2P 710 on the upstream to a P2P 720 on the downstream via the transparent virtual PCI bus 725. Alternatively, in operation of the switch 700 from a physical perspective, the switch 700 implements a crossbar switch that can switch any port to any other port. The table lookups are used to determine whether or not to forward the transaction layer packet based on the settings in the type 0/1 headers. The table lookups are also used to determine how the transaction layer packet will be forwarded and whether or not the packet will be modified prior to forwarding. To populate the lookup tables, the firmware of the switch 700 captures the configuration requests, interprets the type 0/1 headers and modifies the lookup tables as required to properly route the transaction layer packet through the switch 700.

Figure 8:
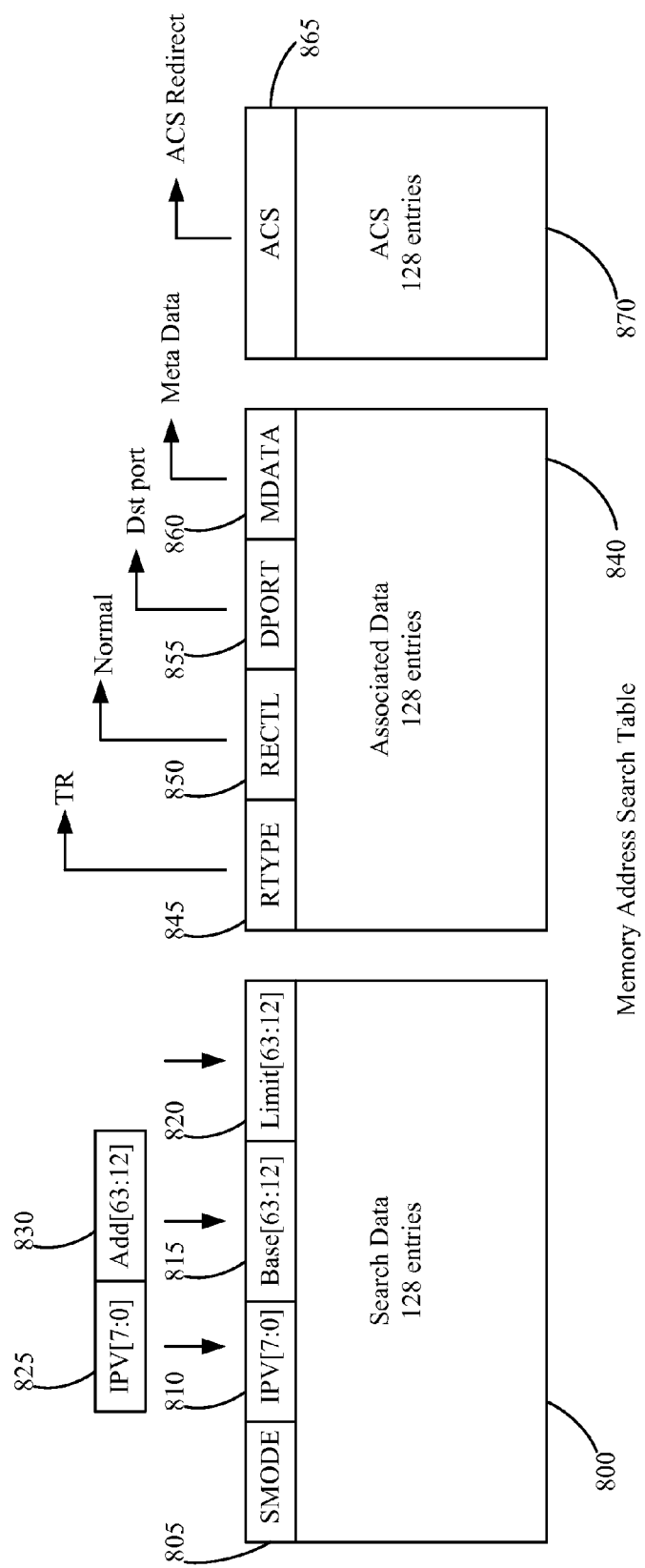
FIG. 8 is a diagram illustrating the routing of a request from a P2P to a translated routing port.

With reference to FIG. 8, in the routing of a translation layer packet request between a P2P and a translated routing port in accordance with an embodiment of the present invention, a memory address search table comprising search data 800, associated data 840 and access control services (ACS) 870. ACS defines a set of control points within a PCIe topology to determine whether a packet should be routed normally, blocked or redirected. ACS is applicable to root complexes (RCs), switches and multi-function I/O devices. The search data 800 may include search mode (SMODE) 805, ingress port vector (IPV) 810, base address 815 and limit address 820. Additionally, the IPV 825 and address 830 may be used to access the search data. The data returned from the search, shown as associated data 840 may include the routing type (RTYPE) 845, the routing exception control (RECTL) 850, the destination port (DPORT) 855 and the meta data (MDATA) 860. The ACS 870 may additionally return an ACS command. In this embodiment, the routing type (RTYPE) returned is TR (translated routing) and as such, the transaction layer packet is routed, unmodified, to the destination port identified as DPORT, wherein the destination port is a translated routing (TR) port.

Figure 9:
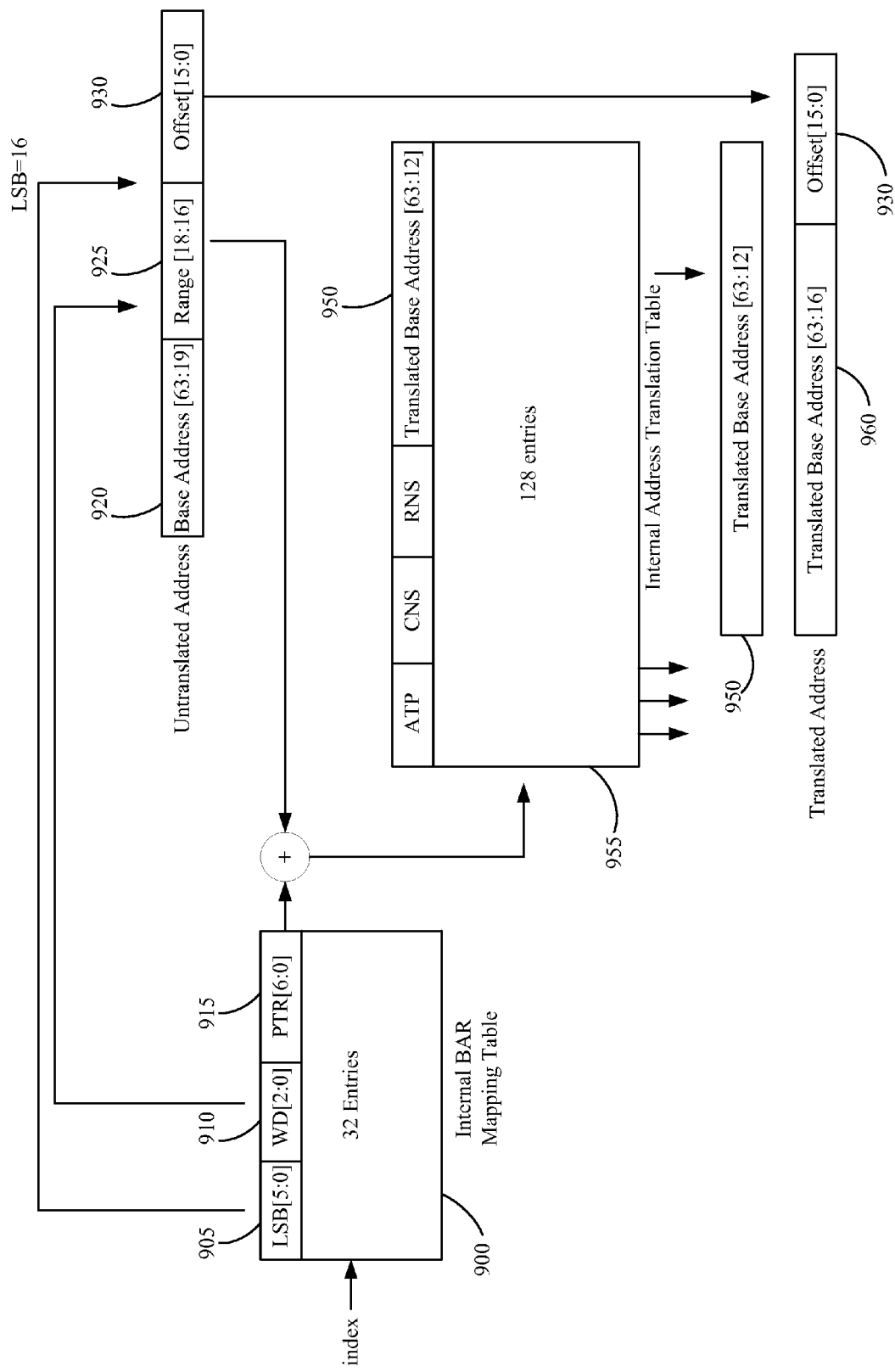
FIG. 9 is a diagram illustrating the address translation of a request from a P2P to a translated routing port.

The address translation of the request is performed at the egress translated routing port as illustrated with reference to FIG. 9. As shown, an index, along with the untranslated address is used to generate the translated address. In this embodiment, an index is used to access an internal BAR (base address register) mapping table 900 comprising a least significant bit (LSB) 905, a width (WD) 910 and a pointer (PTR) 915. The index may be obtained on ingress lookup and the internal BAR mapping table may be at the destination port. The LSB 905 points to the least significant bit of the range field 925 in the untranslated address. An LSB between 0 and 12 inclusive is valid, and will result in not translation. The width field 910 determines the width of the range field 925 and a width of zero is valid. The range field 925 is added to the PTR field 915 to access the internal address translation table 955 to generate the translated base address 950. The translated base address 950 may then be combined with the offset 930 to generate the desired translated base address 960. As shown, the offset 930 overwrites the overlapping bits of the translated base address 950.

Figure 10:
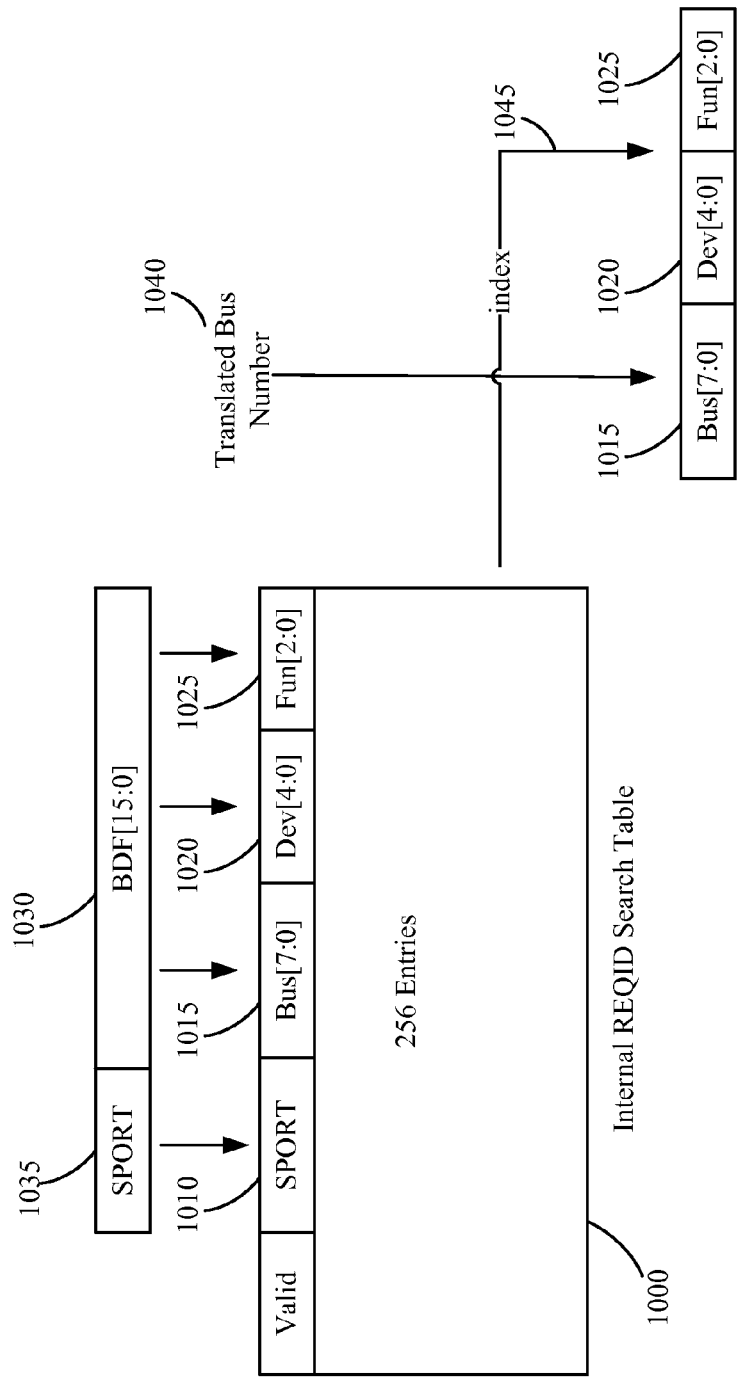
FIG. 10 is a diagram illustrating the REQID translation of a request from a P2P to a translated routing port.

The translation of the requester ID (REQID) also occurs at the egress translated routing port as shown with reference to FIG. 10. The internal REQID search table 1000 is searched for a match with the requester ID BDF (bus, device, function) 1030 and the source port (SPORT) 1035. The fields of the internal REQID search table 1000 may include source port (SPORT) field 1010, bus field 1015, device field 1020 and function field 1025. The device number 1020 and function number 1025 of the matching BDF from the internal REQID search table are overwritten with the index 1045 and the bus number 1015 of the matching BDF is overwritten with the translated bus number 1040 to generate the translated REQID.

Figure 11:
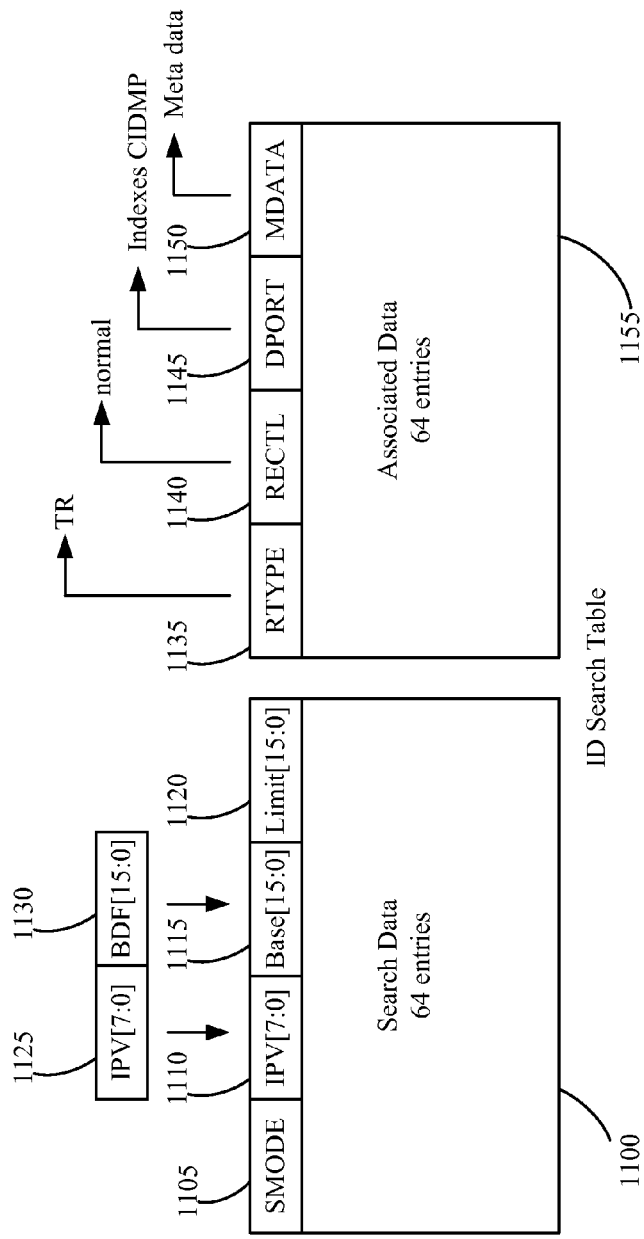
FIG. 11 is a diagram illustrating the routing of a completion of a request from a P2P to a translated routing port.
Figure 12:
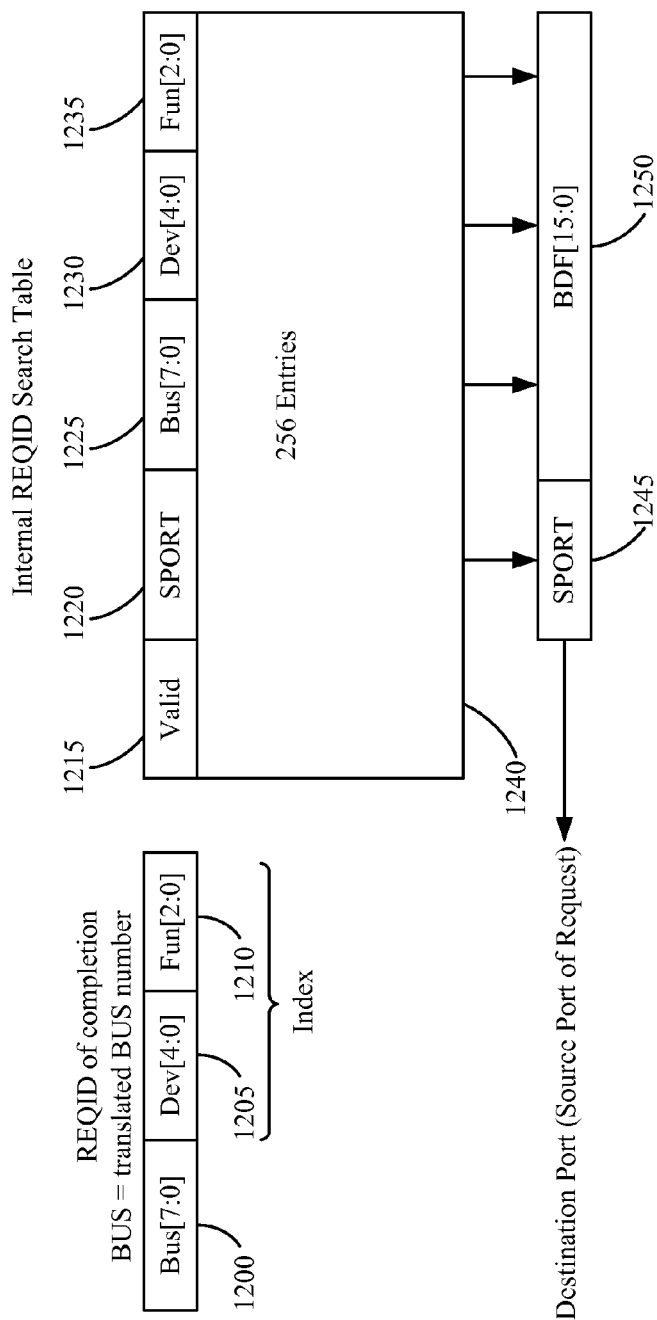
FIG. 12 is a diagram illustrating the REQID of the completion of a request from a P2P to a translated routing port.

After the request has been forwarded to the destination port, a completion may be generated and routed to the original source of the request. With reference to FIG. 11 and FIG. 12, the routing and translation of the completion is illustrated. As shown in FIG. 11, an ID search table may comprise search data 1100 with fields including search mode (SMODE) 1105, ingress port vector (IPV) 1110, base address 1115 and limit address 1120. The ID search table is searched to identify the routing of the completion. The results of the search may comprise associated data 1155 with fields including routing type (RTYPE) 1135, routing exception control (RECTL) 1140, destination port (DPORT) 1145 and meta data (MDATA) 1150. For routing of the completion, RTYPE 1135 is TR and the destination port 1145 indexes a completer ID mapping table. The RTYPE 1135 of TR triggers a search of an internal REQID search table 1240 shown in FIG. 12. The internal REQID search table may include a valid field 1215, a source port (SPORT) field 1220, a bus field 1225, a device field 1230 and a function field 1235. The device 1205 and the function 1210 of the REQID of the completion may be used to index the internal REQID search table, wherein the bus 1200 of the REQID of the completion is equivalent to the translated bus number previous identified. The source port 1220 returned from the internal REQID search table is the source port used to route the packet to the destination port. In this embodiment, the BDF of the REQID is overwritten with the contents returned from the internal REQID search table and the completer ID is overwritten with the value of the completer ID mapping table.

Figure 13:
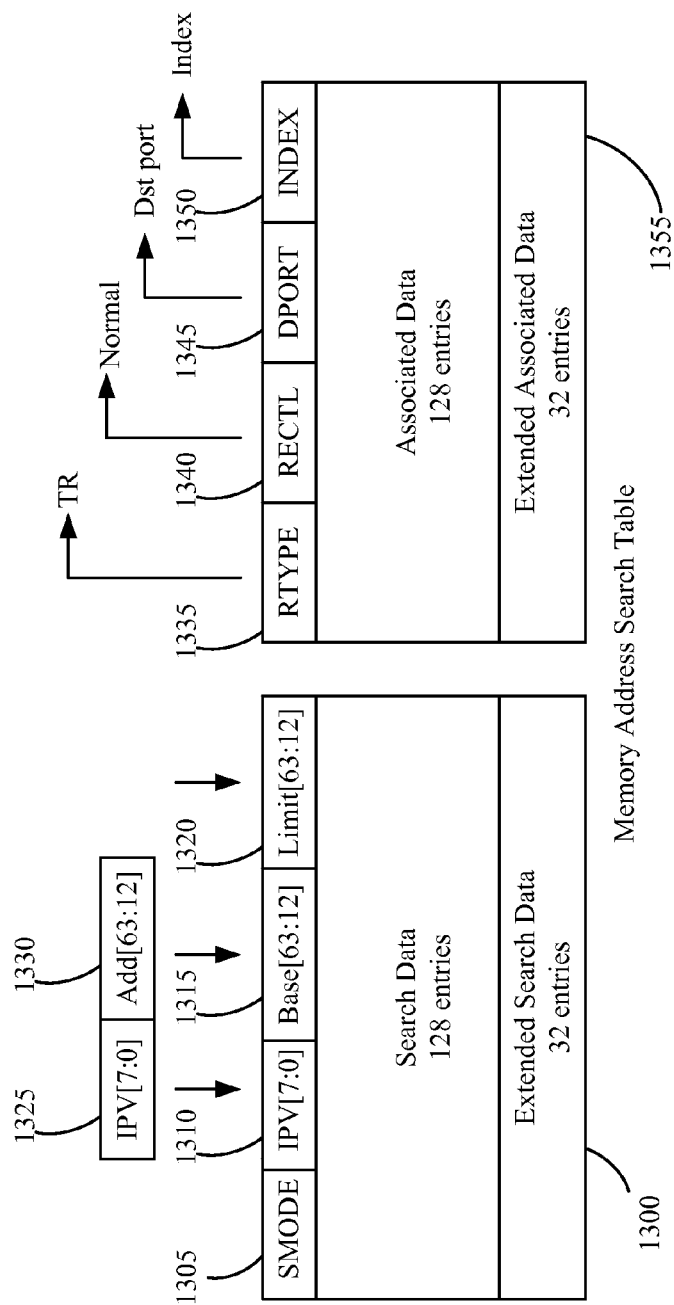
FIG. 13 is a diagram illustrating address routing of a request from a translated routing port to a P2P port.

FIG. 13 illustrates an additional embodiment in which the request may be routed from a translated routing port to a peer-to-peer port. With reference to FIG. 13, a memory address search table and an extended memory address search table may be searched, wherein the routing type is defined to be translated routed. The memory address search table comprises all the peer-to-peer routes that a peer-to-peer port of the stack may require. The additional extended memory address search table comprises the base address registers (BARs) facing the external port. As such, in a particular embodiment, the extended search data includes 32 entries in addition to the 128 entries in the search data to accommodate the translated routing ports. The search data and the extended search data of the memory address search table 1300 may include a search mode (SMODE) field 1305, an ingress port vector (IPV) field, a base field 1315 and a limit field 1320. The ingress port vector 1325 and the address 1330 are used to access the memory address search table 1300. The associated data and the extended associated data 1355 may include a routing type (RTYPE) field 1335, a routing exception control field (RECTL) 1340, a destination port (DPORT) field 1345 and an index field 1350.

Figure 14:
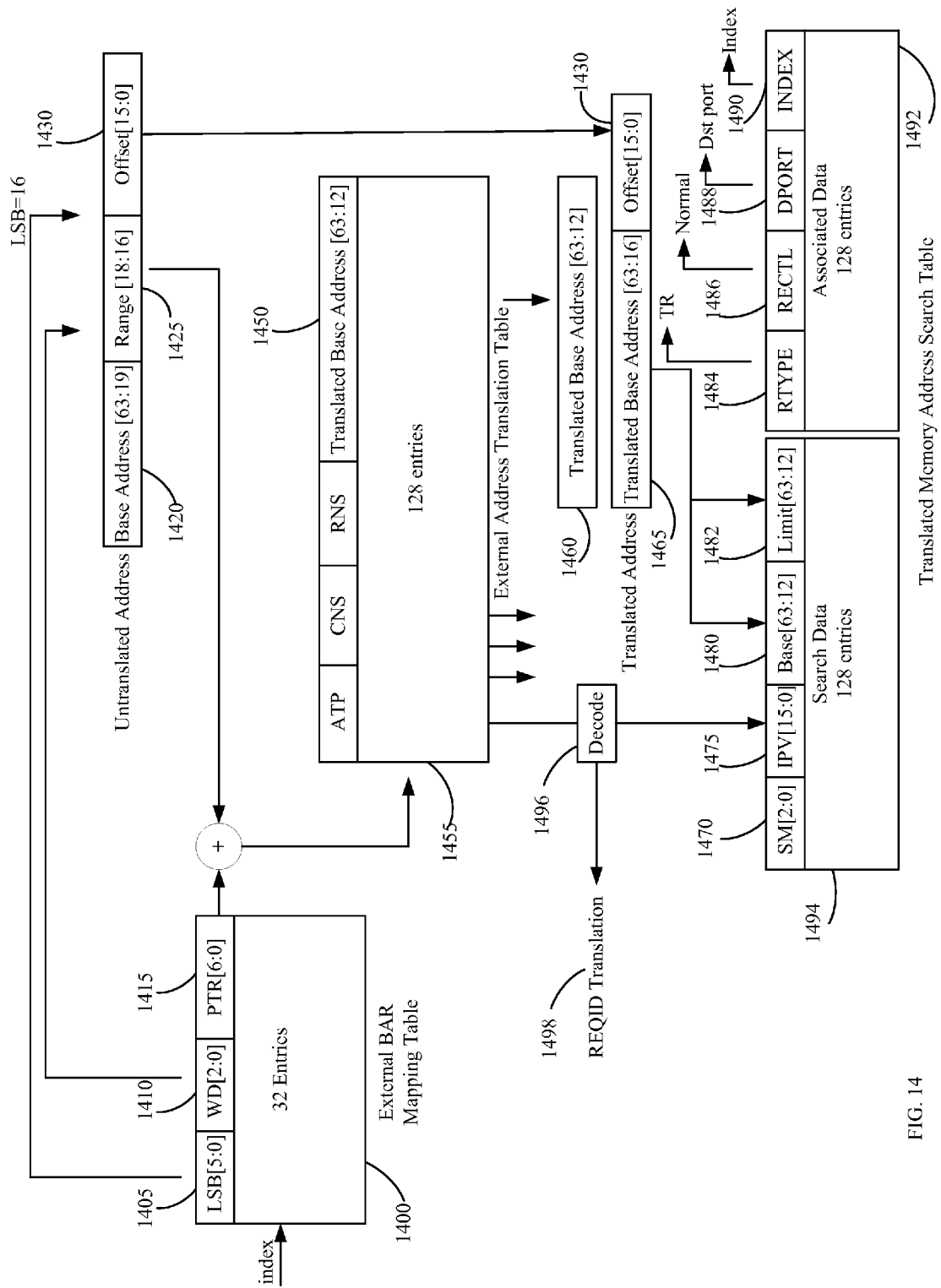
FIG. 14 is a diagram illustrating the translation of a request address from a translated routing port to a P2P port.

To perform the address translation, the index field 1350 returned from the search may be used to retrieve and entry in an external BAR memory mapping table 1400 as shown with reference to FIG. 14. The index is obtained on ingress lookup. The external BAR mapping table 1400 may include a least significant bit (LSB) field 1405, a width (WD) field 1410 and a pointer (PTR) field 1415. The untranslated address comprising a base address 1420, a range 1425 and an offset 1430 may be combined with the result of the external BAR mapping table to access the external address translation table 1455. In particular, the range field 1425 may be added to the PTR field 1415 to access the external address translation table 1455. The external address translation table 1455 may include the translated base address 1450. The translated base address 1460 may be a result of the external address translation table 1455, and the offset 1430 may be combined with the translated base address 1460, resulting in a translated base address 1465 wherein the overlapping bits are overwritten by the offset 1430. The virtual port number may be used to decode 1496 the ingress port vector and translated virtual bus number. The result of the decoding 1496 may be a REQID translation 1498. The translated base address 1465 and the decoded IPV may be used to access a translated memory address search table 1494. The translated memory address search table 1494 may include attached function (SM) 1470, ingress port vector (IPV) field 1475, base field 1480 and limit field 1482. The associated data 1492 of the translated memory address search table may include routing type (RTYPE) field 1484, routing control (RECTL) field 1486, destination port (DPORT) 1488 and index 1490.

Figure 15:
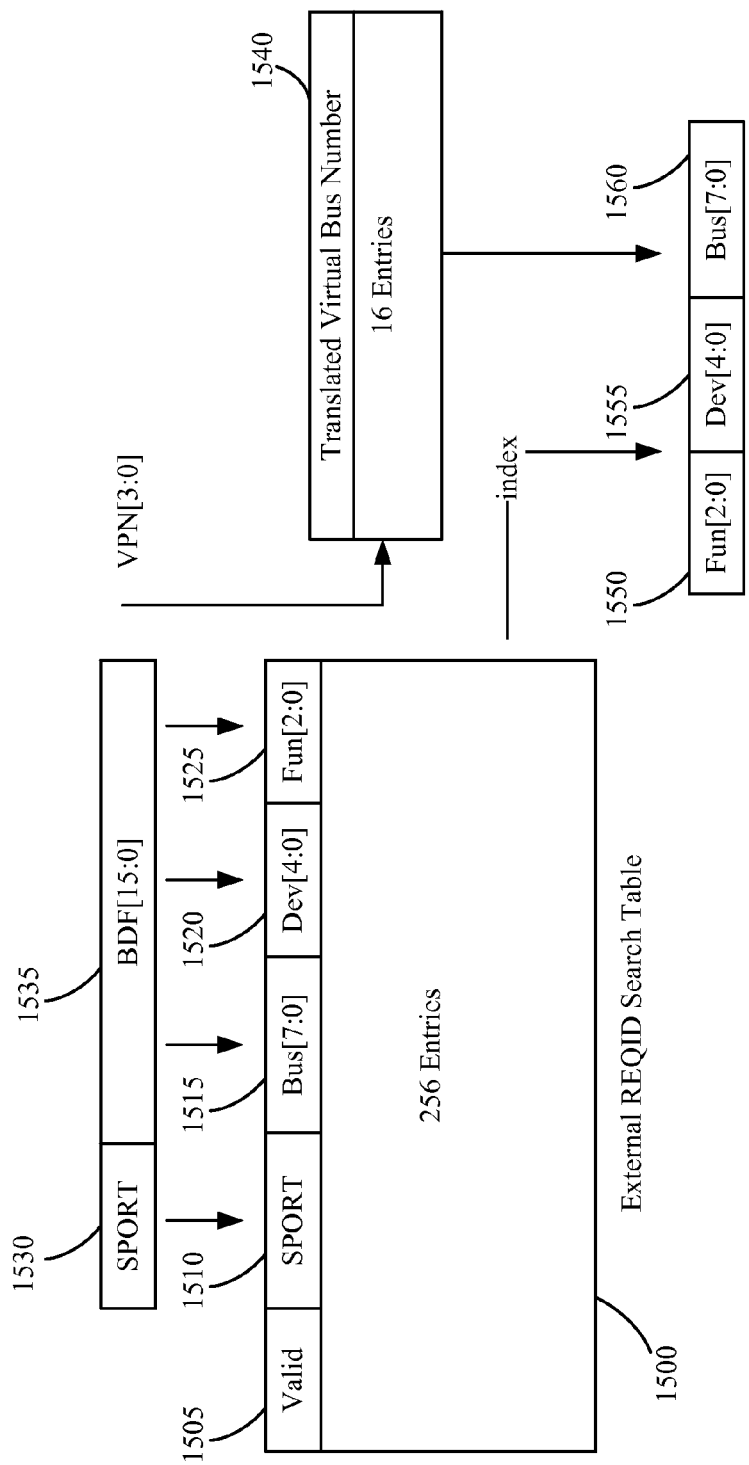
FIG. 15 is a diagram illustrating the translation of a REQID of a request from a translated routing port to a P2P port.

Translation of the REQID is performed as illustrated in FIG. 15. To translate the REQID of the request, the source port (SPORT) 1530 and the REQID BDF 1535 are used to search an external REQID search table 1500. The external REQID search table may include a valid field 1505, a SPORT field 1510, a bus field 1515, a device field 1520 and a function field 1525. To translate the REQID, the device number 1555 and function number 1550 are overwritten with the index from the external REQID search table 1500 and the bus number 1560 is overwritten with the translated virtual bus number 1540.

Figure 16:
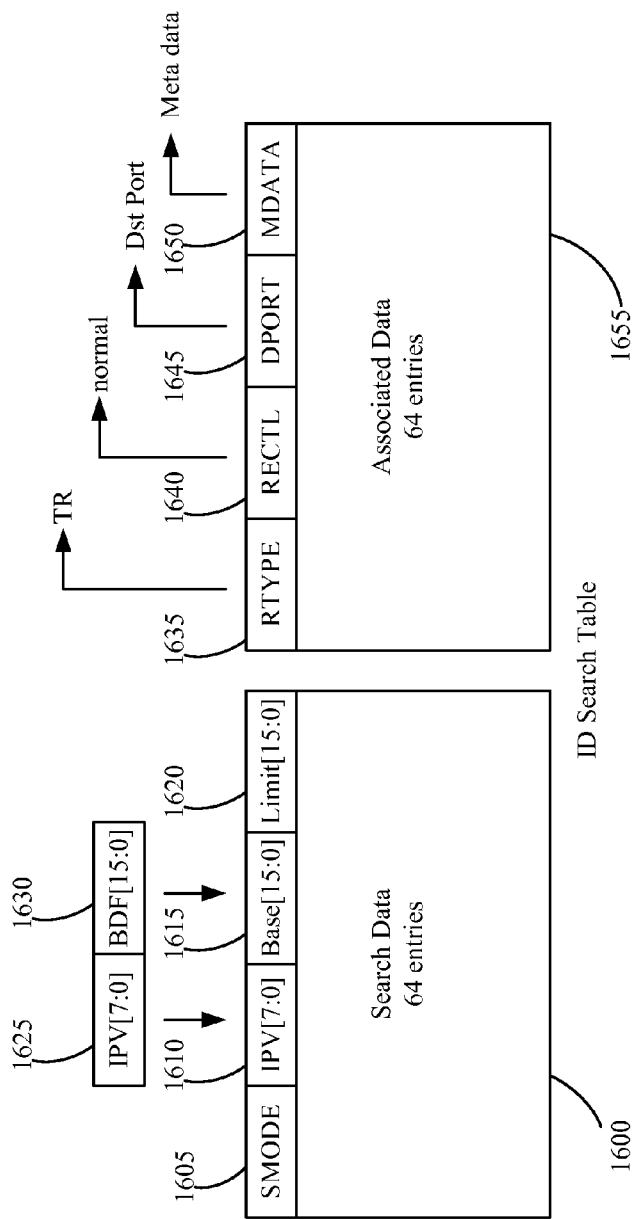
FIG. 16 is a diagram illustrating the routing of a completion of a request from a translated routing port to a P2P port.

After the REQID has been translated, the completion may be routed as shown with reference to FIG. 16. To route the completion, an ID search table is searched at the ingress peer-to-peer port. The search data of the ID search table 1600 may include a search mode (SMODE) field 1605, an ingress port vector (IPV) field 1610, a base field 1615 and a limit field 1620. The ingress port vector (IPV) 1635 and BDF 1630 may be used to access the ID search table. The associated data 1655 resulting from the search of the ID search table may include routing type (RTYPE) 1635, routing exception control (RECTL) 1640, destination port (DPORT) 1645 and meta data (MDATA) 1650. Based upon the results of the search, the translation layer packet request may be routed according to the destination port 1645 of the associated data 1655.

Figure 17:
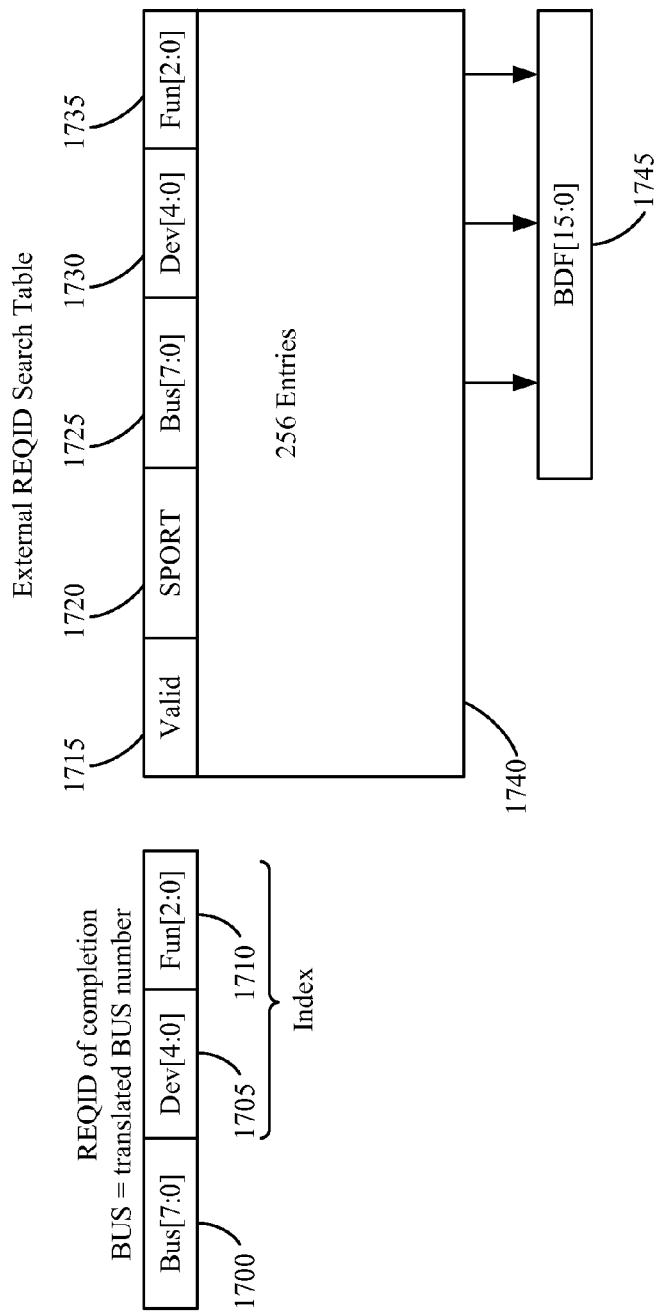
FIG. 17 is a diagram illustrating the REQID translation of the completion of a request from a translated routing port to a P2P port.

After the completion has been routed to the destination port, the REQID of the completion may be translated at the egress translated routing port as shown with reference to FIG. 17. To translate the REQID of the completion, the device number 1705 and function number 1710 of the REQID of the untranslated completion are used to index the external REQID search table 1740 and the resulting BDF 1745 is used for the translated REQID field. The bus number 1700 of the REQID of the completion is equal to the translated bus number. The external REQID search table may include a valid field 1715, a SPORT field 1720, a bus field 1725, a device field 1730 and a function field 1735 that are used to complete the resulting BDF 1745.

In an additional embodiment, transaction layer packet requests received on a peer-to-peer stack of the switch may be multicasted to multiple peer-to-peer and translated routing ports. In multicast routing, transaction layer packets that are routed to peer-to-peer ports or translated routing ports do not have their addresses translated, with the exception of multicast overlay. Transaction layer packets that are routed to peer-to-peer ports do not have their REQID translated and transaction layer packets that are routed to translated routing ports have their REQID translated the same way a unicast transaction layer packet has its REQID translated at the egress translated routing port. Since multicast does not support non-posted requests, there are no completions required.

In addition, requests may be routed from translated routing ports via untranslated multicast. The routing process in this case will be identical to multicast routing, except there is no multicast partition enable applied, as the translated routing ports may multicast to any partition. The transaction layer packets that are routed to peer-to-peer ports or translated routing ports do not have their addresses translated, with the exception of multicast overlay. All transaction layer packets will have their REQID translated at the ingress translated routing port in the same way as a unicast transaction layer packet received at a translated routing port. Transaction layer packets that are routed to peer-to-peer ports do not have their REQID translated again at the egress port, just like a unicast transaction layer packet. Transaction layer packets that are routed to a translated routing port have their REQID translated again, in the same way that a unicast TLP would have its REQID translated twice. Multicast does not support non-posted requests, so routing of completions is not required.

In an additional embodiment, transaction layer packets may be routed from a translated routing port via translated multicast routing. When a transaction layer packet received on a translated routing port is multicasted to peer-to-peer and other translated ports, the routing is the same as a unicast packet received on a translated routing port, except the translated memory address search table indicates a routing type of "multicast". The transaction layer packet has its address translated at an ingress translated routing port in the same way as a unicast transaction layer packet received on a translated routing port that has a routing type of "translated". Transaction layer packets that are routed to peer-to-peer or translated routing ports do not have their addresses translated on egress, with the exception of multicast overlay. All transaction layer packets have their REQID translated at the ingress translated routing port in the same way as a unicast transaction layer packet received at a translated routing port. Transaction layer packets that are routed to peer-to-peer ports do not have their REQID translated again at the egress ports, just like a unicast transaction layer packet. Transaction layer packets that are routed to a translated routing port have their REQID translated again, in the same way that a unicast transaction layer packet would have its REQID translated twice. Multicast does not support non-posted requests, so routing completions are not required.

Figure 18:
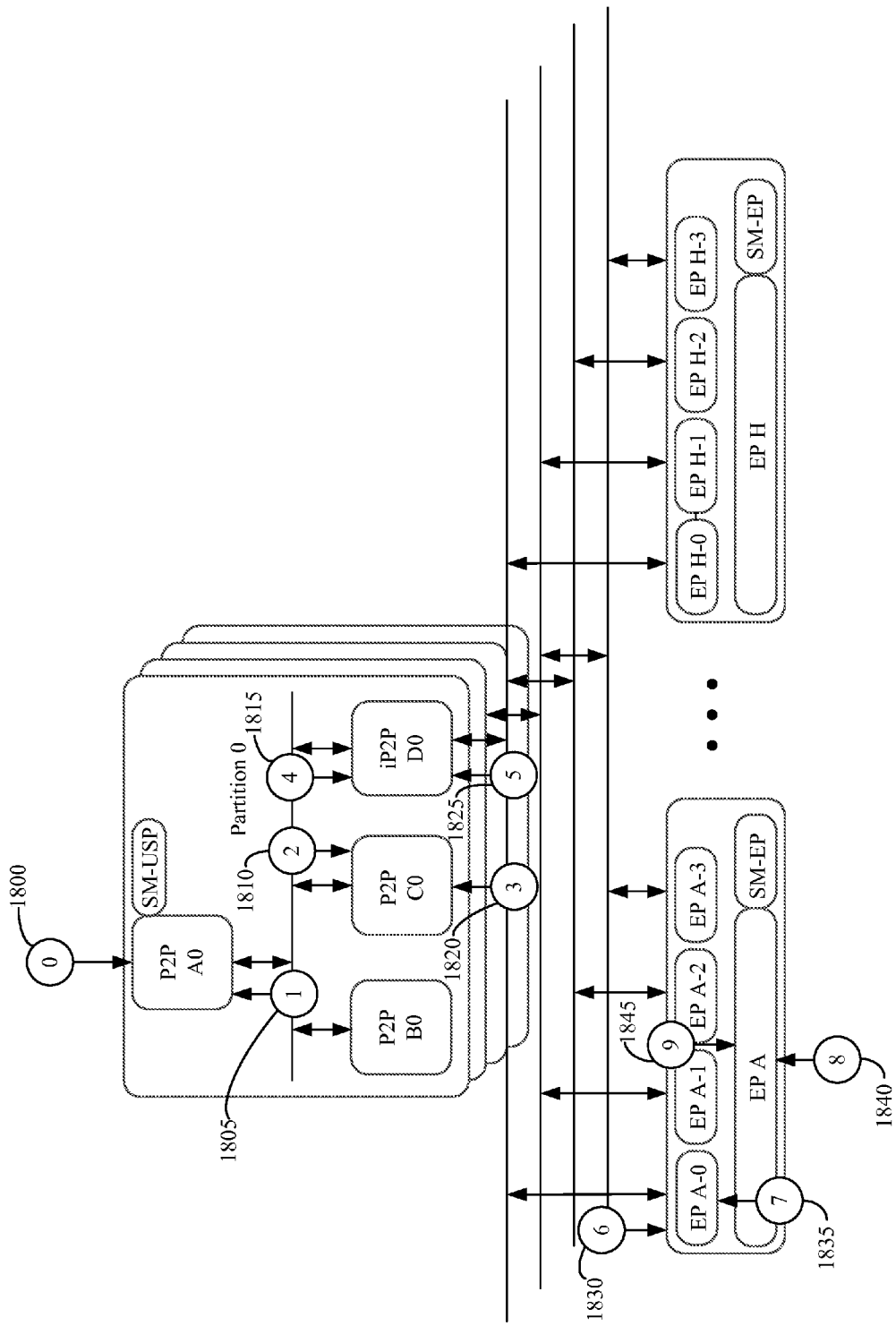
FIG. 18 is a diagram illustrating an exemplary embodiment wherein the firmware of the switch modifies the memory address search tables to implement routing control for BME and MSE.

FIG. 18 illustrates an exemplary embodiment of the present invention in which the firmware modifies the memory address search tables to implement routing control for Memory Space Enable (MSE) and Bus Master Enable (BME). The modifications include:

(0) 1800 USP MSE=0:
   All memory requests are treated as unsupported requests (URs) that logically flow down through A0. The completer ID is A0 BDF. Note that the attached function, Switch Manger (SM), is not affected, i.e. routes that target the SM are not treated as unsupported requests, as those routes do not flow through A0. Firmware in the switch is responsible for the MSE bit in the attached SM function's type 0 header.
   The firmware changes RECTL.A0=discardMR.UR.S (discard memory requests, treat as UR, completer ID=source port), for each table entry where A0 is in the IPV and the route flow down through A0.

(1) 1805 USP BME=0

All memory requests are treated as unsupported requests that logically flow up through A0. The completer ID is A0 BDF for direct routes and for translated routes, the completer ID is BDF of the EP facing the link. Note that attached function, SM-USP, is not affected as those routes do not logically flow up through A0. Firmware in the switch is responsible for the BME bit in the attached SM-USP function's type 0 header.
   The firmware changes RECTL.EP=discardMR.UR.S for each table entry where an EP is in the IPV, and the route flows up through A0, i.e. EP_A–0.
   The firmware changes RECTL.P2P=discardMR.UR.D (discard memory requests, treat as UR, completer ID=destination port), for each table entry where a DSP P2P is in the IPV and the route flows up through A0, i.e. B0.

(2) 1810 DSP MSE=0:
   All memory requests are treated as unsupported requests that logically flow down though C0. The completer ID is C0 BDF for direct routes and for translated routes it is BDF of the EP facing the link.
   The firmware changes RECTL.EP=discardMR.UR.S, for each table entry where an EP is in the IPV and the route flows down through C0, i.e. EP_A–0.
   The firmware changes RECTL.P2P=discardMR.UR.D, for each table entry where a DSP P2P is in the IPV and the route flows down through C0, i.e. B0.

(3) 1820 DSP BME=0:
   All memory requests are treated as unsupported requests that logically flow up through C0. The completer ID is C0 BDF.
   Firmware changes RECTL=discardMR.UR.S, for each table entry where C0 is in the IPV.

(4) 1815 iDSP MSE=0:
   All memory requests are treated as unsupported requests that logically flow down through D0. The completer ID is D0 BDF.
   Firmware adds an entry for C0 B&L (base and limit) with RECTL=discardMR.UR.D with higher search precedence than the EPs.

(5) 1825 iDSP BME=0:
   All memory requests are treated as unsupported requests that logically flow up through D0. The completer ID is the BDF of the EP facing the link.
   Firmware changes RECTL=discardMR.UR.S, for each table entry where an EP is in the IPV and the route flows up through D0, i.e. EP_A–0.

(6) 1830 EP_A–0 MSE=0:
   All memory requests are treated as unsupported requests that are logically received by EP_A–0. The completer ID is the BDF for EP_A–0. The index to the P2CID [127:0] (Port 2 Completer ID Table) is determined as follows by hardware:
   index[6:2]=DPORT[6:2]
   index[1:0]=source partition
   Firmware changes RECTL=discardMR.UR.D, for table entries for EP_A–0.

(7) 1835 EP_A–0 BME=0:
   All memory requests that are treated as unsupported requests that are logically transmitted by EP_A–0. The completer ID is the BDF of the EP facing the link.
   Firmware changes RECTL=discardMR.UR.S, for each table entry where EP_A is in the IPV and the route flows up through EP_A–0.

(8) 1840 EP_A MSE=0:

All memory requests are treated as unsupported requests that are logically received by EP_A. The completer ID is the BDF for EP_A.

Firmware changes RECTL.EP_A=discardMR.UR.S, for each table entry where EP_A is in the IPV and the route flows up through EP_A-[3:0].

(9) 1845 EP_A BME=0:

All memory requests are treated as unsupported requests that are logically transmitted by EP_A. The completer ID is the BDF for EP_A-[3:0]. The index to the P2CID[127:0] is determined as follows by hardware:

index[6:2]=DPORT[6:2]
index[1:0]=source partition

Firmware changes RECTL=discardMR.UR.D, for the tables entries for EP_A-[3:0].

For multicast TLPs, (0) 1800, (3) 1820, (7) 1835, (8) 1840 handle the multicast TLPs entering the switch. For each USP (1) 1805 with BME clear and for each DSP (2) 1810 with MSE clear, and for each EP (6) 1830 with MSE clear, and for each EP (9) 1845 with BME clear, firmware clears the corresponding bit in the multicast vector enable.

In various embodiments, the switch 100 is implemented in an integrated circuit of an integrated circuit device, which may include an integrated circuit package containing the integrated circuit. In some embodiments, the switch 100 is implemented in a single integrated circuit die. In other embodiments, the switch 100 is implemented in more than one integrated circuit die of an integrated circuit device which may include a multichip package containing the integrated circuit die.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A method for translated routing in an interconnect switch, the method comprising
    receiving, at a switch manager of a switch, a configuration transaction layer packet from a root complex coupled to the switch;
    running firmware at the switch manager to identify a desired behavior for a switch stack of the switch from the received configuration transaction layer packet, wherein the switch stack comprises port logic that implements a physical layer, a data link layer and a transaction layer function of an interconnect protocol of the switch;
    updating an address translation table and a requester ID search table of a translated routing port of the switch based upon the desired behavior for the switch stack;
    receiving a transaction layer packet request employing address routing at the translated routing port of the switch from a source port, the transaction layer packet request originating inside the switch and comprising a memory address and a requester identification (ID);
    translating the memory address at the translated routing port utilizing an internal address translation table of the port to generate a translated address;
    translating the requester ID at the translated routing port utilizing an internal requester ID search table of the port;
    searching a translated memory address search table utilizing the translated address to identify a destination port; and
    routing the transaction layer packet and the translated requester ID to the destination port identified by the translated memory address.

2. The method of claim 1, wherein the switch is a Peripheral Component Interconnect Express (PCIe) switch.

3. The method of claim 1, wherein the switch is a RapidIO switch.

4. The method of claim 1, wherein the switch further comprises an external address translation table for translating the address of requests originating and terminating outside of the switch.

5. The method of claim 1, wherein the switch further comprises an external requester ID search table for translating the requester ID of requests originating and terminating outside of the switch.

6. The method of claim 1, wherein the updating an address translation table and a requester ID search table of a translated routine port of the switch based upon the desired behavior for the switch stack further comprises updating the internal address translation table and the internal requester ID search table of a translated routing port of the switch based upon the desired behavior for the switch stack.

7. The method of claim 1, wherein the transaction layer packet request terminates inside switch.

8. The method of claim 1, further comprising:
    generating a completion;
    untranslating the translated requester ID; and
    routing the completion to the source port based upon the untranslated requester ID.

9. The method of claim 1, wherein the source port is a peer-to-peer port and the method further comprises multicast routing the translated request to a plurality of destination ports, including peer-to-peer ports and translated routing ports.

10. A system for translated routing in an interconnect switch, the system comprising:
    a switch comprising a switch manager operable to receive a configuration transaction layer packet from a root complex coupled to the switch, run firmware to identify a desired behavior for a switch stack of the switch from the received configuration transaction layer packet, wherein the switch stack comprises port logic that implements a physical layer, a data link layer and a transaction layer function of an interconnect protocol of the switch, update an address translation table and a requester ID search table of a translated routing port of the switch based upon the desired behavior for the switch stack, and the switch further comprising at least one translated routing port, the translated routing port for;
    receiving a transaction layer packet request employing address routing from a source port, the transaction layer packet request originating inside the switch and comprising a memory address and a requester ID;
    translating the memory address at the translated routing port utilizing an internal address translation table of the port to generate a translated address;
    translating the requester ID at the translated routing port utilizing an internal requester ID search table of the port;
    searching a translated memory address search table utilizing the translated address to identify a destination port; and routing the transaction layer packet and the translated requester ID to the destination port identified by the translated memory address.

11. The system of claim 10 further comprising an external address translation table for translating the address of requests originating and terminating outside of the switch.

12. The system of claim 10 further comprising an external requester ID search table for translating the requester ID of requests originating and terminating outside of the switch.

13. A switch for translated routing, the switch comprising:
a switch manager, the switch manager operable upon receiving a configuration transaction layer packet from a root complex coupled to the switch to run firmware to identify a desired behavior for a switch stack of the switch from the received configuration transaction layer packet, wherein the switch stack comprises port logic that implements a physical layer, a data link layer and a transaction layer function of an interconnect protocol of the switch and operable to update an address translation table and a requester ID search table of a translated routing port of the switch based upon the desired behavior for the switch stack; and
at least one translated routing port, the translated routing port operable to receive a transaction layer packet request employing address routing from a source port, the transaction layer packet request originating inside the switch and comprising a memory address and a requester identification (ID), operable to translate the memory address at the translated routing port utilizing an internal address translation table of the port to generate a translated address, operable to translate the requester ID at the translated routing port utilizing an internal requester ID search table of the port, operable to search a translated memory address search table utilizing the translated address to identify a destination port and operable to route the transaction layer packet and the translated requester ID to the destination port identified by the translated memory address.

14. The switch of claim 13 further comprising an external address translation table for translating the address of requests originating and terminating outside of the switch and an external requester ID search table for translating the requester ID of requests originating and terminating outside of the switch.

15. The switch of claim 14 wherein the switch manager is operable to instantiate an internal peer to peer port for each transparent virtual bus of a plurality of transparent virtual buses that the one or more translated routing port connects to, the one or more translated routing port connected to a translated virtual bus that is coupled to the internal peer to peer port.

16. The switch of claim 13 wherein the stack utilizes both type 0 and type 1 headers, the switch manager operable upon receiving a type 0 configuration request translation packet from the root complex to interpret the type 0 configuration request and update one or more of the routing tables of the switch stack, and operable upon receiving a type 1 configuration request translation packet from the root complex to interpret the type 1 configuration request and update one or more of the routing tables of the switch stack.

17. The switch of claim 16 wherein the switch manager is operable to modify the memory address search table to implement routing control for the memory space enable (MSE) and bus master enable (BME) bits of the type 0 headers and the type 1 headers.

* * * * *

UNITED STATES PATENT AND TRADEMARK OFFICE
CERTIFICATE OF CORRECTION

Page 1 of 1

PATENT NO.         : 8,995,302 B1
APPLICATION NO.    : 13/743281
DATED              : March 31, 2015
INVENTOR(S)        : Brown et al.

It is certified that error appears in the above-identified patent and that said Letters Patent is hereby corrected as shown below:

In the specification
Column 7 line 58, "10" should read --IO--.

In the claims
Claim 6, column 16 line 23, "routine" should read --routing--.

Signed and Sealed this
Sixteenth Day of February, 2016

Michelle K. Lee
*Director of the United States Patent and Trademark Office*